(12) United States Patent
Yoo et al.

(10) Patent No.: US 7,528,918 B2
(45) Date of Patent: May 5, 2009

(54) THIN FILM TRANSISTOR SUBSTRATE OF FRINGE FIELD SWITCHING TYPE AND FABRICATING METHOD THEREOF

(75) Inventors: Soon Sung Yoo, Gunpo-si (KR); Youn Gyoung Chang, Anyang-si (KR); Heung Lyul Cho, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 488 days.

(21) Appl. No.: 11/256,092

(22) Filed: Oct. 24, 2005

(65) Prior Publication Data

US 2006/0285050 A1    Dec. 21, 2006

(30) Foreign Application Priority Data

Jun. 20, 2005    (KR)    ............... 10-2005-0053123

(51) Int. Cl.
    *G02F 1/1343*    (2006.01)
(52) U.S. Cl. .................. 349/141; 349/146; 349/147
(58) Field of Classification Search ............ 349/41–53, 349/141, 139–152
    See application file for complete search history.

(56) References Cited

U.S. PATENT DOCUMENTS 5,561,440 A * 10/1996 Kitajima et al. ............... 345/87
6,486,934 B2 * 11/2002 Yun et al. .................... 349/141
6,600,524 B1 * 7/2003 Ando et al. .................... 349/43
2001/0048500 A1 * 12/2001 Lim et al. .................... 349/141
2005/0105034 A1 * 5/2005 Ono et al. .................... 349/143
2006/0146241 A1 * 7/2006 Choi et al. .................. 349/129

* cited by examiner

*Primary Examiner*—Mike Qi
(74) *Attorney, Agent, or Firm*—McKenna Long & Aldridge LLP

(57) ABSTRACT

A fringe field switching type thin film transistor substrate includes a double layered structure gate line; a data line crossing the gate line, wherein a gate insulating film is formed therebetween; a thin film transistor having a gate electrode connected to the gate line, a source electrode connected to the data line, and a drain electrode opposing the source electrode; a double layered structure common line parallel to the gate line; a common electrode plate integrated with the transparent conductive layer of the common line and formed in a pixel area defined by the crossing of the gate line and the data line; a pixel electrode slit covering the drain electrode of the thin film transistor and overlapping the common electrode plate, wherein the gate insulating film is formed therebetween in the pixel area; and a data protection pattern covering the data line and the source electrode.

4 Claims, 28 Drawing Sheets

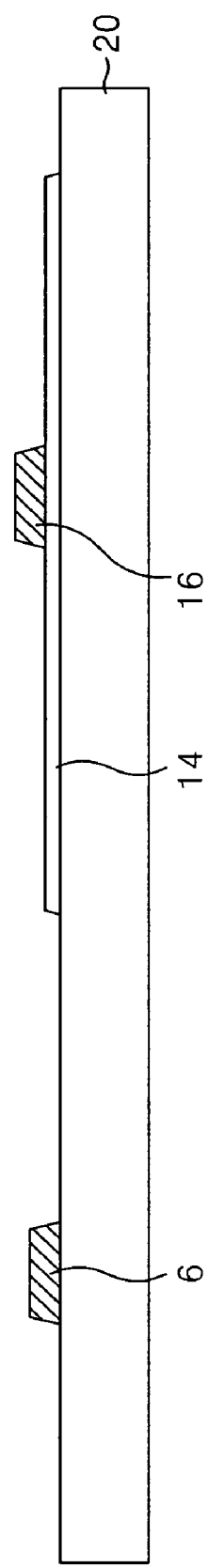

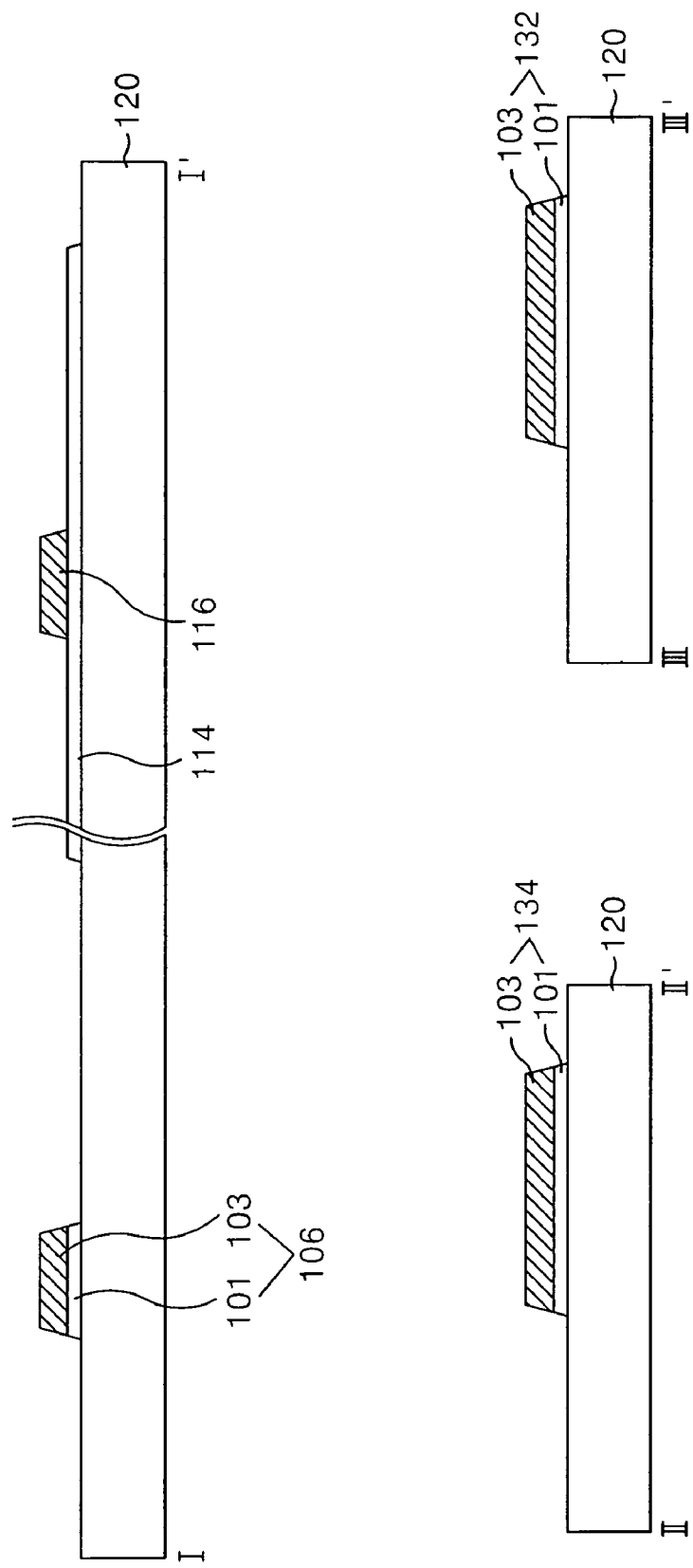

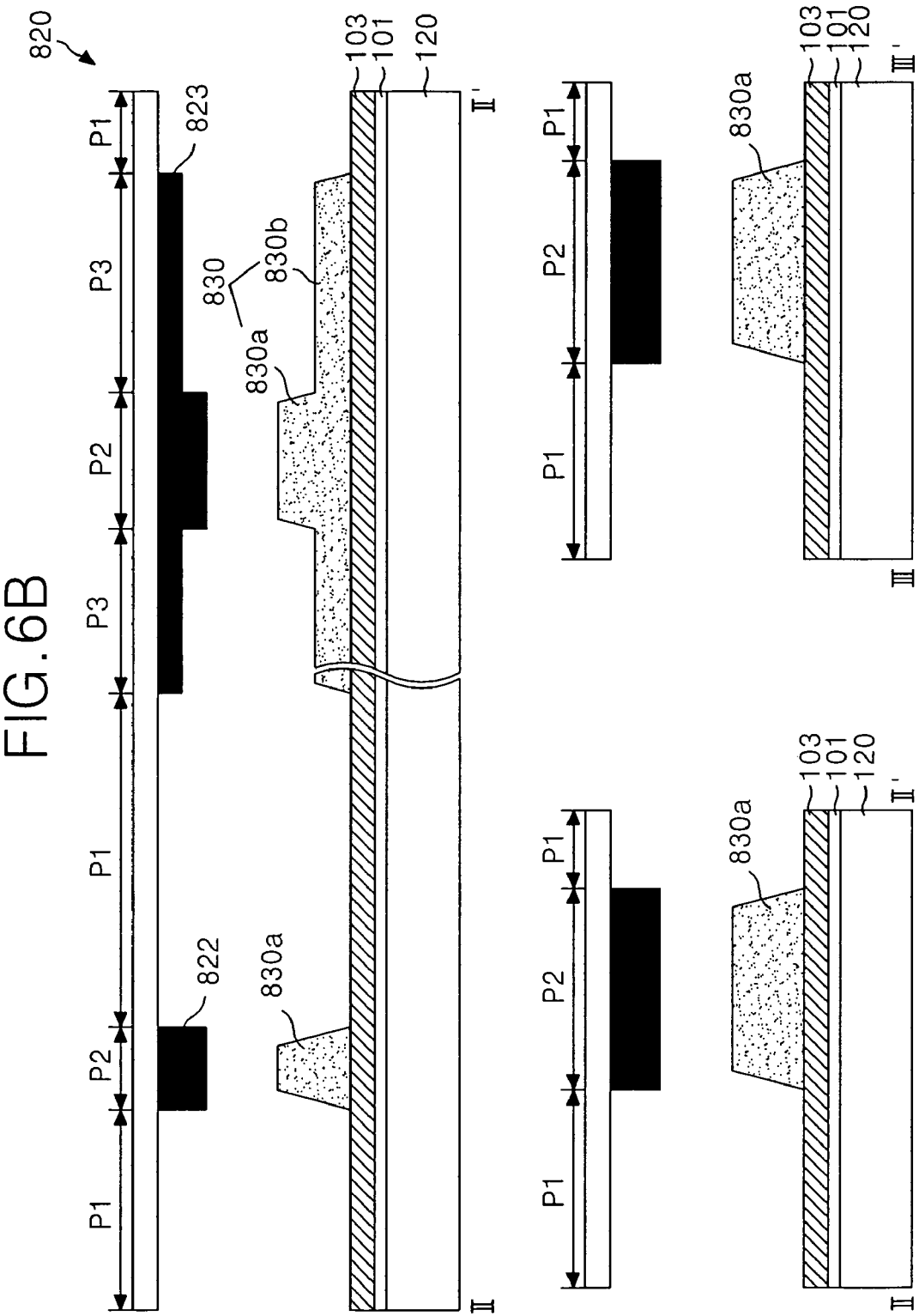

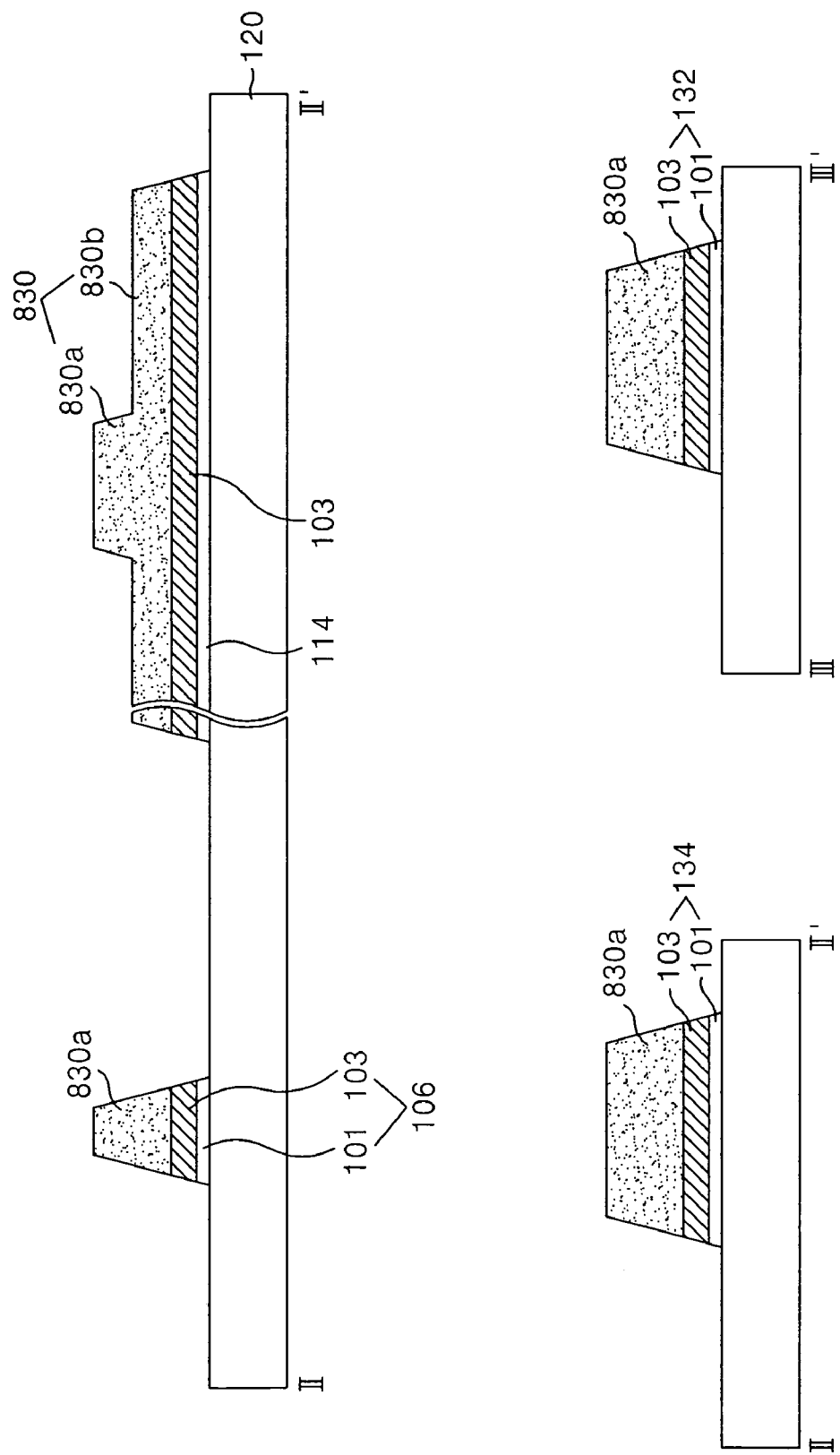

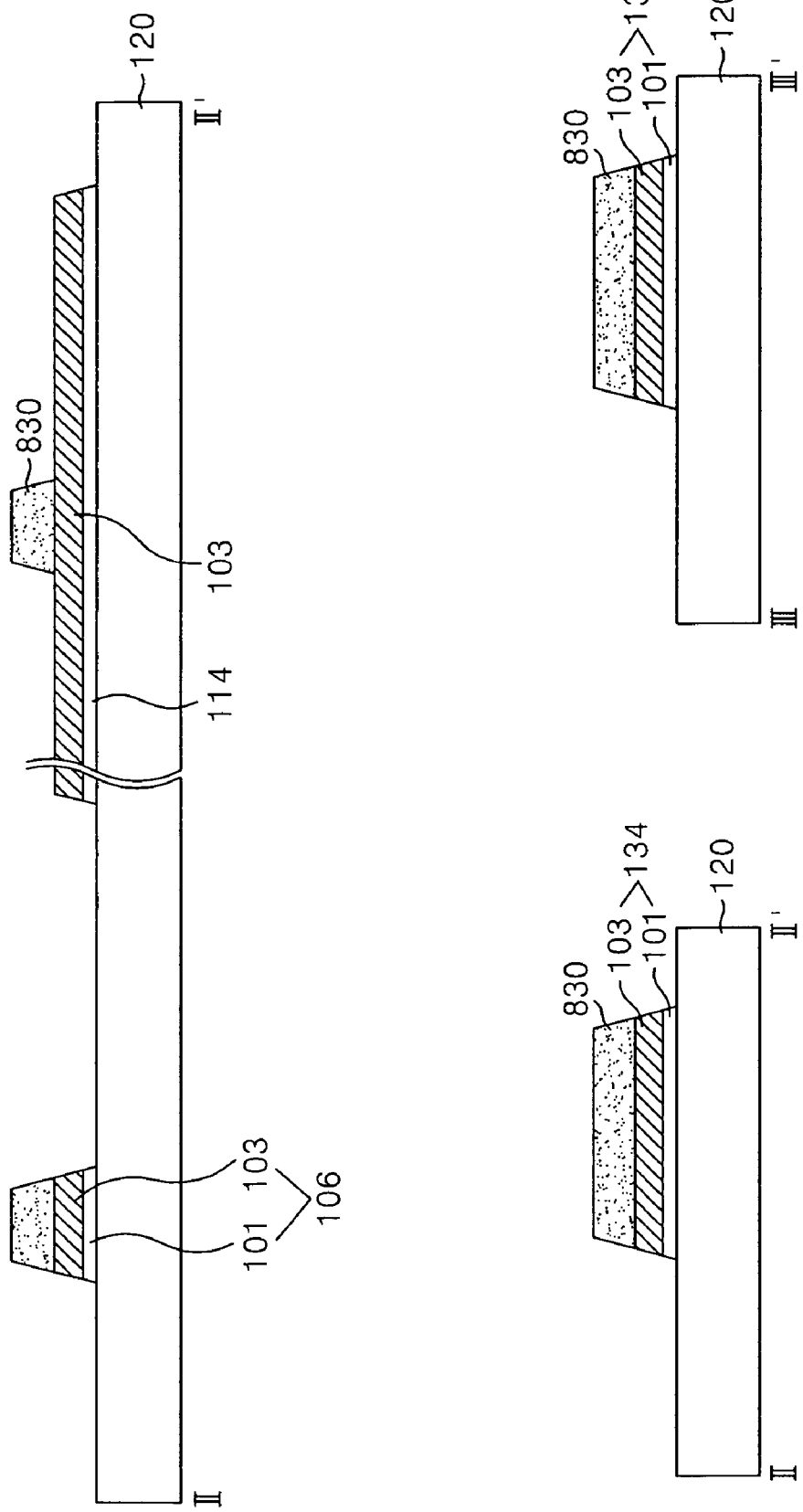

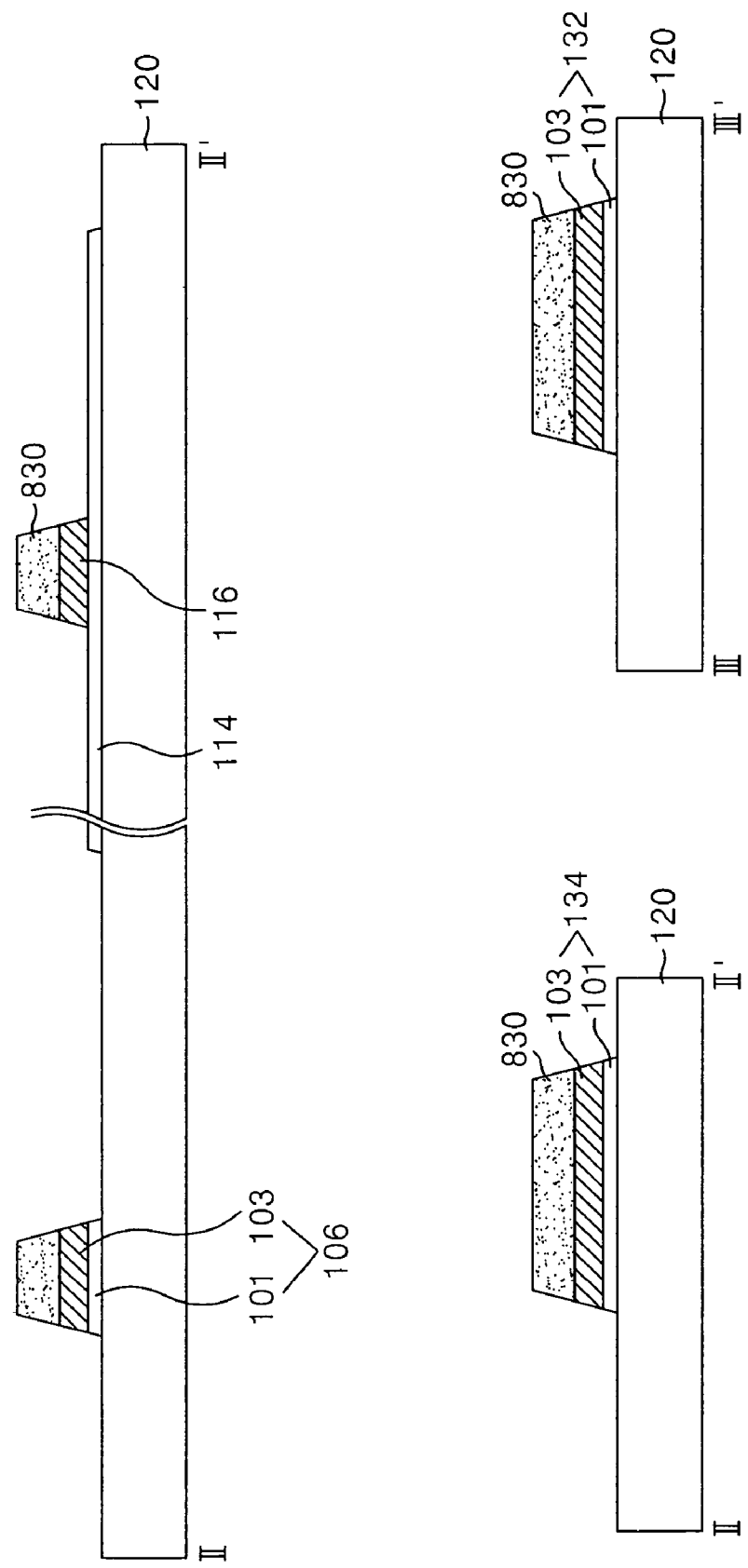

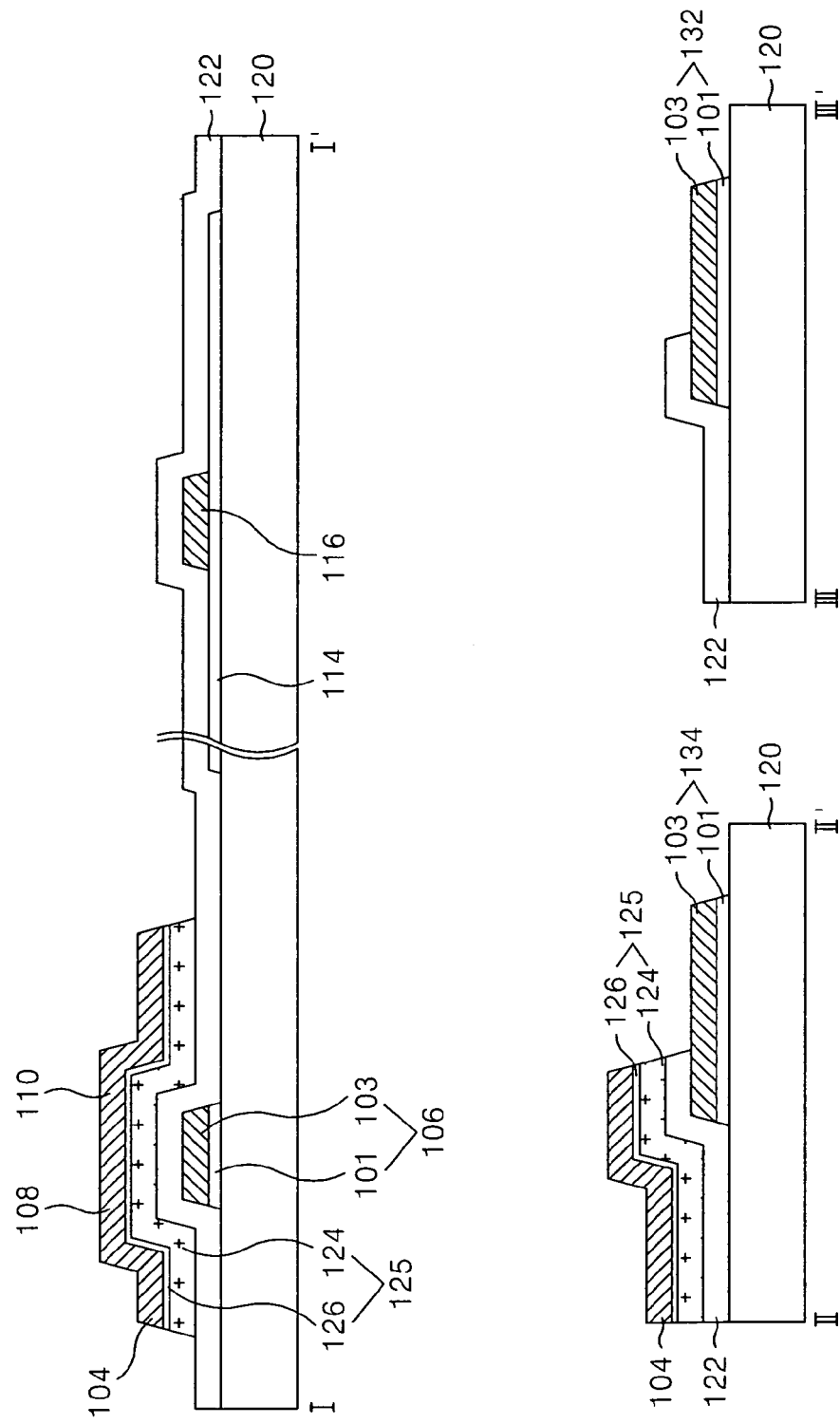

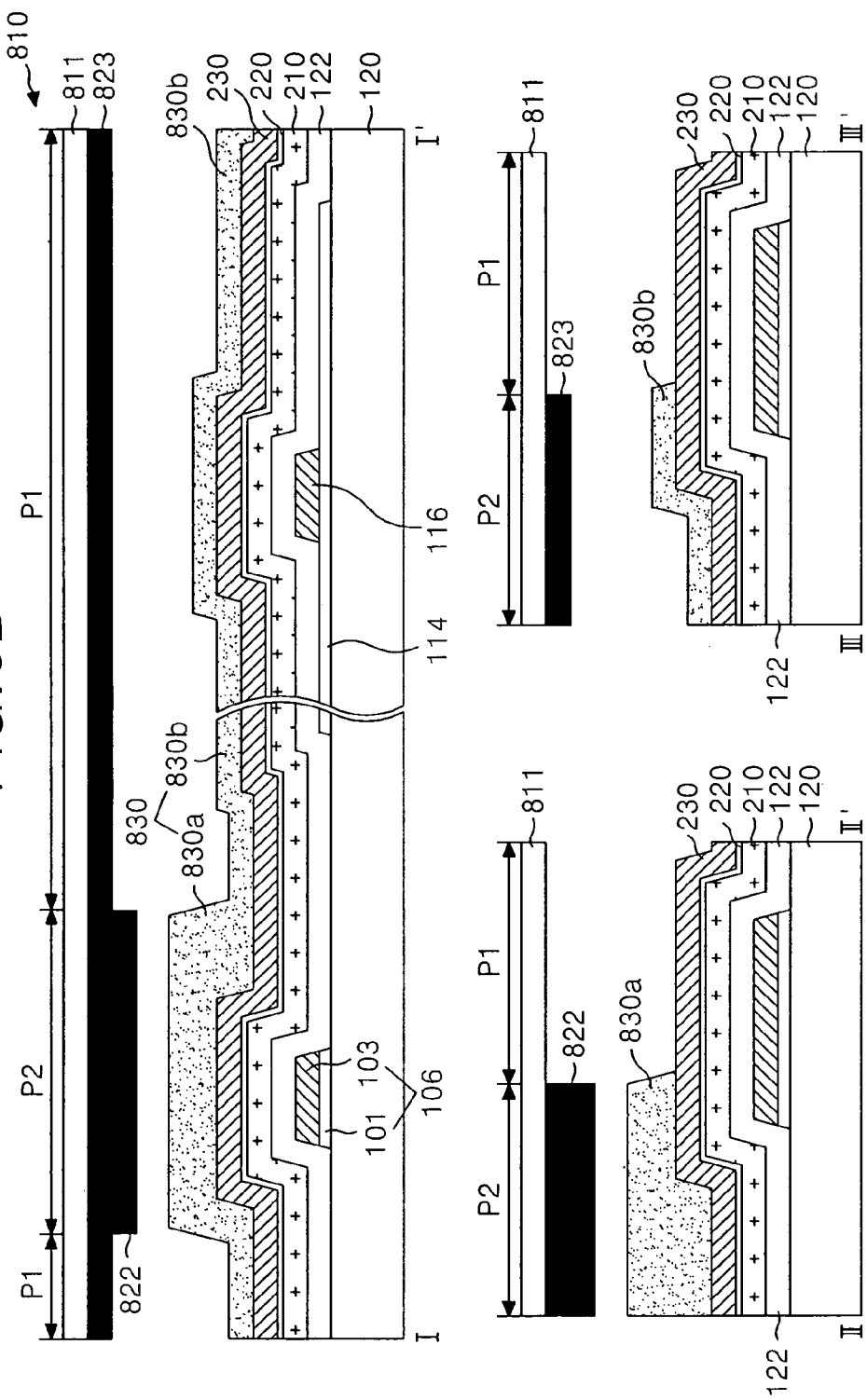

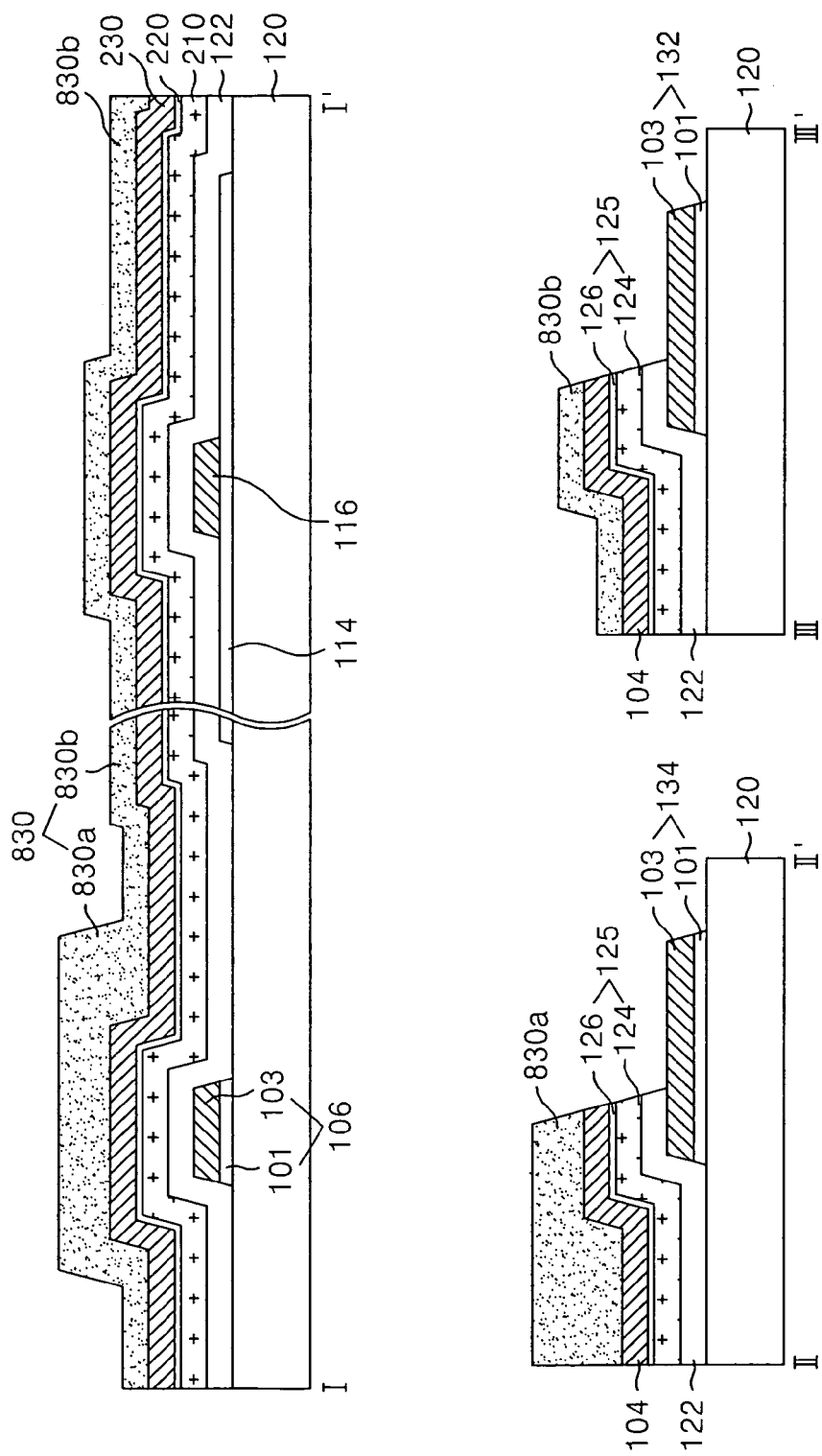

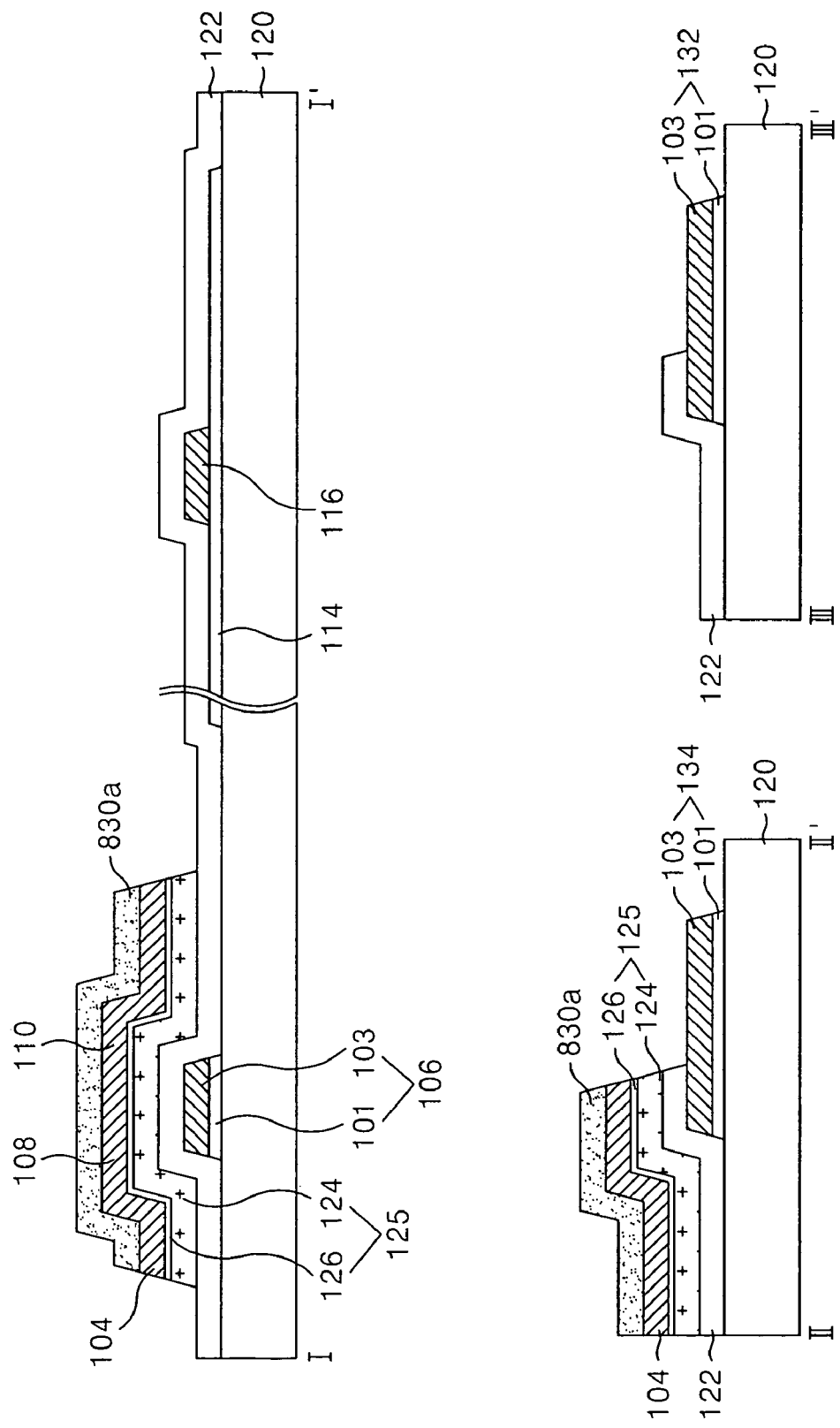

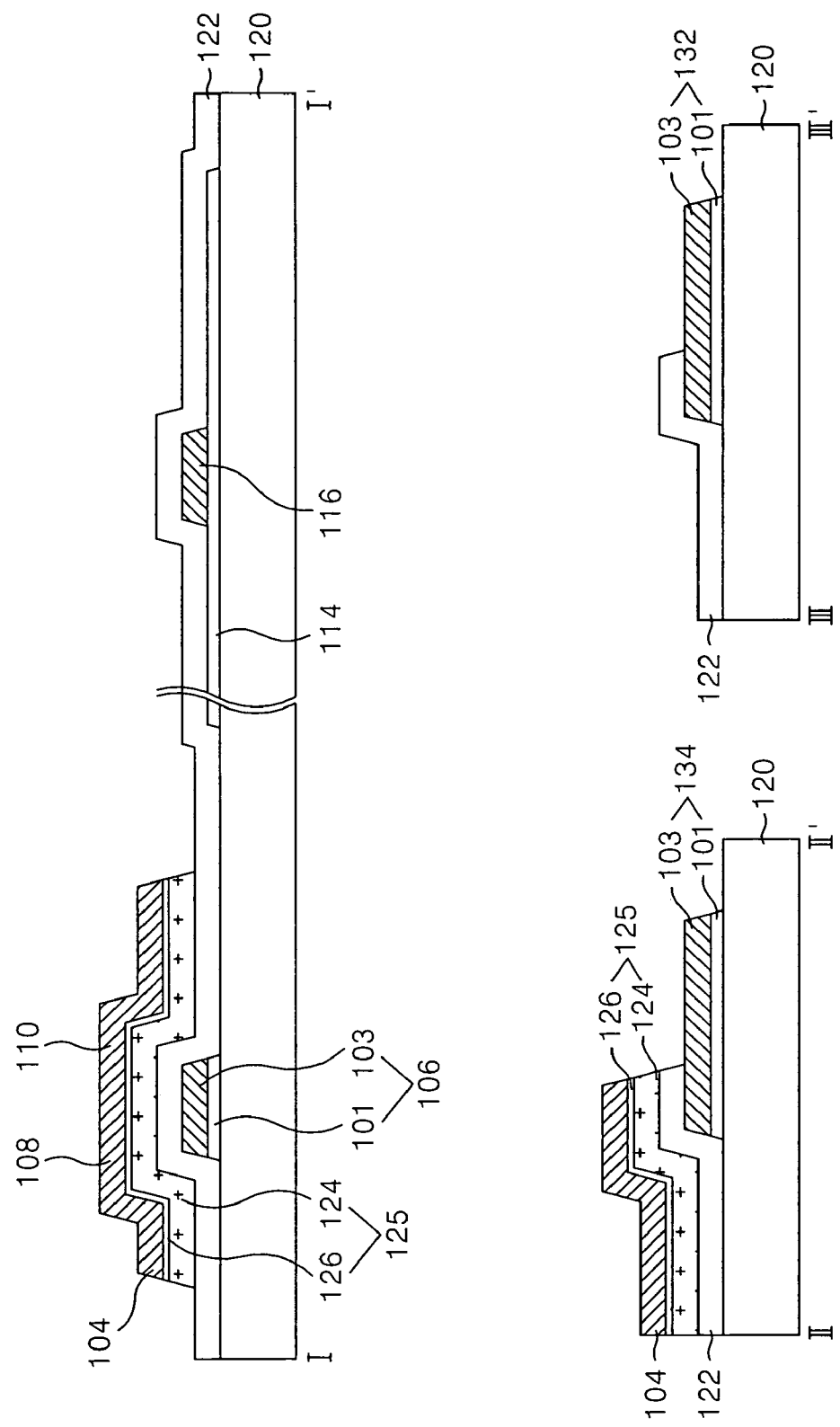

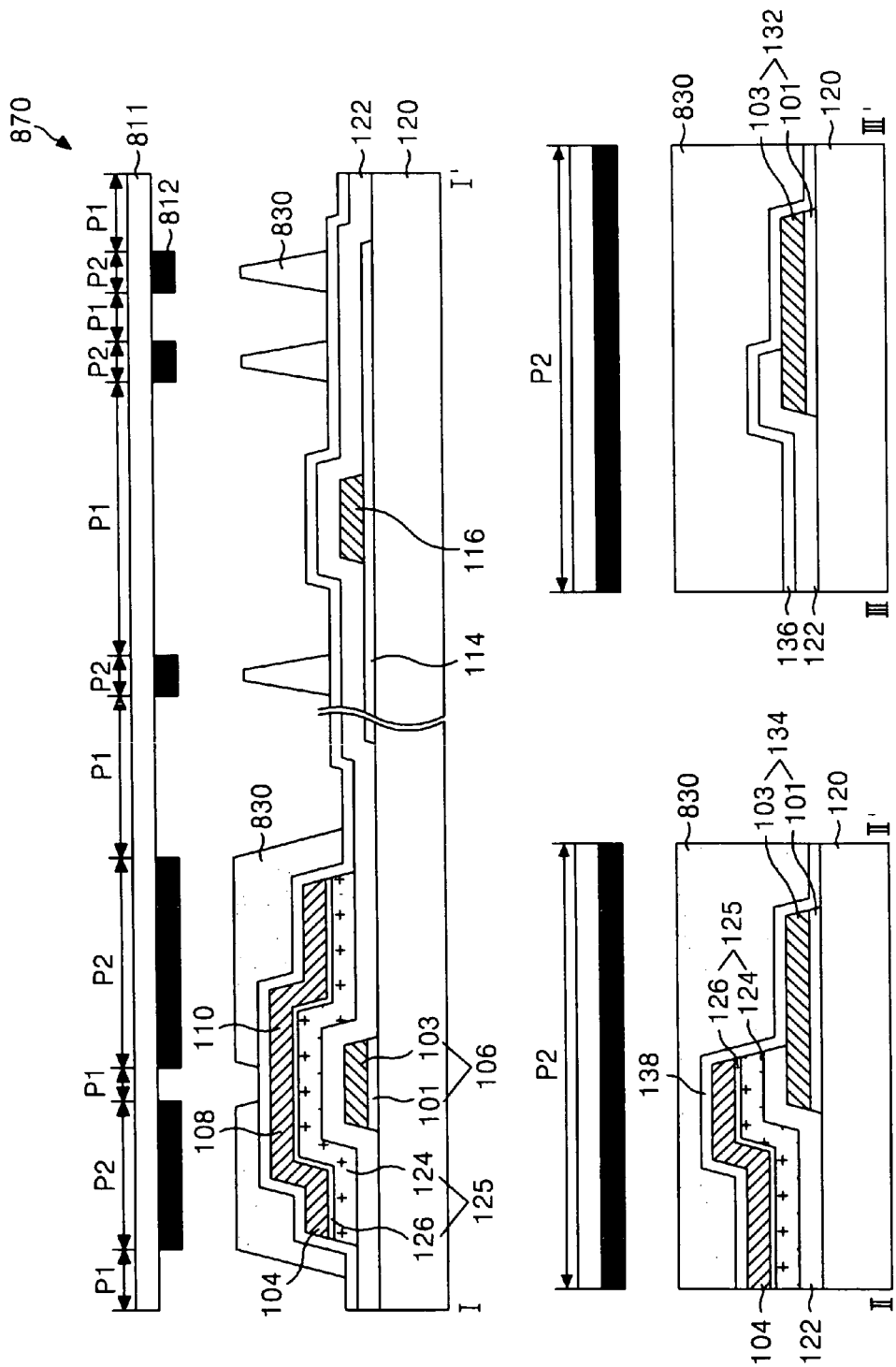

THIN FILM TRANSISTOR SUBSTRATE OF FRINGE FIELD SWITCHING TYPE AND FABRICATING METHOD THEREOF

This application claims the benefit of Korean Patent Application No. P2005-53123, filed on Jun. 20, 2005, which is hereby incorporated by reference for all purposes as if fully set forth herein.

BACKGROUND OF THE INVENTION

1. Field of the Invention

The present invention relates to a fringe field switching type thin film transistor substrate and a fabricating method thereof, and more particularly to a fringe field switching type thin film transistor substrate that is adapted to simplify processing, and a fabricating method thereof.

2. Description of the Related Art

A liquid crystal display (LCD) device controls the light transmittance of liquid crystal by using an electric field to display a picture. Liquid crystal display devices are divided into two main classes according to the electric field direction in which liquid crystal is driven. The classes are vertical electric field applying type liquid crystal display devices and horizontal electric field applying type liquid crystal display devices.

The vertical electric field applying type liquid crystal display device drives a liquid crystal of twisted nematic (hereinafter "TN") mode by a vertical electric field which is formed between a pixel electrode and a common electrode arranged opposing each other in upper and lower substrates. The vertical electric field applying type liquid crystal display device has an advantage in that its aperture ratio is high but a disadvantage in that its viewing angle is narrow.

The horizontal electric field applying type liquid crystal display device drives a liquid crystal of in-plane switch (hereinafter "IPS") mode by a horizontal electric field between a pixel electrode and a common electrode which are arranged in parallel in the lower substrate. The horizontal electric field applying type liquid crystal display device has an advantage in that its viewing angle is wide but a disadvantage in that its aperture ratio is low.

In order to improve the above-mentioned disadvantages, there has been proposed a fringe field switching (hereinafter "FFS") type liquid crystal display device which is operated by a fringe field. The FFS type liquid crystal display device includes a common electrode plate and a pixel electrode, wherein an insulating film is formed therebetween in a pixel area. The FFS type liquid crystal display device also includes a gap between the common electrode plate and the pixel electrode, wherein the gap is formed more narrow than the gap between upper and lower substrates to form a fringe field. The FFS type liquid crystal display device also includes liquid crystal molecules filled between the upper and lower substrates, wherein the liquid crystal molecules are operated by the fringe field, thereby improving aperture ratio and transmittance.

FIG. 1 is a sectional diagram representing a FFS type thin film transistor substrate of the related art;

Referring to FIG. 1, the FFS type thin film transistor substrate of the related art includes a gate line 6 and a data line (not shown) formed on a substrate 20 to cross each other wherein a gate insulating film 22 is formed therebetween; a thin film transistor (hereinafter "TFT") formed at each crossing of the gate line 6 and the data line; a common electrode plate 14 and a pixel electrode slit 18 which are formed with a gate insulating film 22 and a passivation film 28 therebetween so as to form a fringe field at a pixel area provided by a cross structure of the gate lines 6 and the data line; and a common line 16 connected to the common electrode plate 14.

The common electrode plate 14 is formed at each pixel area and receives a reference voltage (hereinafter "common voltage") for driving liquid crystal through the common line 16 which is formed on the common electrode plate 14 and connected thereto. The common electrode plate 14 is a transparent conductive layer and the common line 16 is formed of a gate metal layer like the gate line.

The TFT makes a pixel signal of the data line 4 charged and kept in the pixel electrode slit 18 in response to a gate signal of the gate line. For this, the TFT includes a gate electrode 6 connected to the gate line; a source electrode 8 connected to the data line 4; a drain electrode 10 connected to the pixel electrode slit 18; an active layer which overlaps the gate electrode 6 with a gate insulating film 22 therebetween to form a channel between the source electrode 8 and the drain electrode 10; and an ohmic contact layer 26 for having the active layer 24 in ohmic contact with the source electrode 8 and the drain electrode 10. Semiconductor pattern 25 includes contact layer 26 and active layer 24.

The pixel electrode slit 18 is formed to be connected to the drain electrode 10 of the TFT through a contact hole which penetrates the passivation film 28. Also, the pixel electrode slit 18 is formed to overlap the common electrode plate 14. The pixel electrode slit 18 forms a fringe field with the common electrode plate 14 to make liquid crystal molecules, which are arranged in a horizontal direction between a TFT substrate and a color filter substrate, rotate by dielectric anisotropy. The transmittance of the light which penetrates the pixel area is changed in accordance with the extent of rotation of the liquid crystal molecules, thereby realizing the gray level.

Furthermore, there is formed a storage capacitor, which keeps the video signal supplied to the pixel electrode slit 18 stable in an overlapping part of the common electrode plate 14 and the pixel electrode slit 18.

Hereinafter, a fabricating method of a FFS type TFT substrate of the related art is explained, in reference to FIGS. 2A to 2E.

Referring to FIG. 2A, the common electrode plate 14 is formed in each pixel area of the substrate 20 by a first mask process. The common electrode plate 14 is formed at each pixel area by using a first mask to pattern a transparent conductive layer by a photolithography process and an etching process after forming the transparent conductive layer on the substrate 20.

Referring to FIG. 2B, a gate metal pattern inclusive of the gate line, the gate electrode 6 and the common line 16 is formed on the substrate 20 where the common electrode plate 14 is formed by a second mask process. The gate metal pattern is formed by using a second mask to pattern a gate metal layer by the photolithography process and the etching process after forming the gate metal layer on the substrate 20 where the common electrode plate 14 is formed.

Referring to FIG. 2C, the gate insulating film 22 is formed on the substrate 20 where the gate metal pattern is formed. Furthermore, by a third mask process, a semiconductor pattern 25 inclusive of the active layer 24 and the ohmic contact layer 26, and a source/drain metal pattern inclusive of the data line 4, the source electrode 8 and the drain electrode 10 is formed on the gate insulating film 22.

To describe this in detail, the gate insulating film 22, an amorphous silicon layer, n+ amorphous silicon layer and the source/drain metal layer are sequentially formed on the substrate 20 where the gate metal pattern is formed. Then, a photo-resist pattern with a stepped difference is formed by the photolithography process using a third mask, which is a diffractive exposure mask, on the source/drain metal layer. The photo-resist pattern with the stepped difference has relatively low height in a channel part of the TFT. The source/drain pattern and the semiconductor pattern thereunder are formed by the etching process using the photo-resist pattern. Subsequently, the photo-resist pattern is ashed and the exposed source/drain pattern is removed together with the ohmic contact layer 26 thereunder, thereby separating the source electrode 8 and the drain electrode 10.

Referring to FIG. 2D, the passivation film 28 inclusive of the contact hole 12 is formed by a fourth mask process on the gate insulating film 22 where the source/drain metal pattern is formed. The passivation film 28 is formed on the entire surface of the gate insulating film 22 where the source/drain metal pattern is formed and the passivation film 28 is patterned by the photolithography process and the etching process using a fourth mask, thereby forming the contact hole 12 which exposes the drain electrode 10.

Referring to FIG. 2E, the pixel electrode slit 18 is formed on the passivation film 28 by a fifth mask. The pixel electrode slit 18 is formed by using a fifth mask to pattern a transparent conductive layer by the photolithography process and the etching process after forming the transparent conductive layer on the passivation film 28.

In this way, the FFS type TFT substrate of the related art is formed by five mask processes. Each of the mask processes includes many steps such as a thin film deposition process, a cleaning process, a photolithography process, an etching process, a photo-resist peeling process and an inspection process. Thus, the FFS type TFT substrate of the related art has a disadvantage in that its fabrication is complicated.

SUMMARY OF THE INVENTION

Accordingly, the present invention is directed to a thin film transistor of fringe field switching type and a fabricating method thereof.

An advantage of the present invention is to provide a fringe field switching type thin film transistor substrate that is adapted to simplify processing.

Another advantage of the present invention is to provide a fabricating method of the fringe field switching type thin film transistor substrate.

Additional features and advantages of the invention will be set forth in the description which follows, and in part will be apparent from the description, or may be learned by practice of the invention. The objectives and other advantages of the invention will be realized and attained by the structure and method particulary pointed out in the written description and claims hereof as well as the appended drawings.

To achieve these and other advantages and in accordance with the purpose of the invention, as embodied and broadly described, a fringe field switching type thin film transistor substrate includes a double layered structure gate line having a transparent conductive layer and a metal layer on a substrate; a data line crossing the gate line, wherein a gate insulating film is formed therebetween; a thin film transistor having a gate electrode connected to the gate line, a source electrode connected to the data line, a drain electrode opposing the source electrode; a double layered structure common line having the transparent conductive layer and the metal layer, wherein the double layered structure common line is parallel to the gate line; a common electrode plate integrated with the transparent conductive layer of the common line and formed in a pixel area defined by the crossing of the gate line and the data line; a pixel electrode slit covering the drain electrode of the thin film transistor and overlapping the common electrode plate, wherein the gate insulating film is formed therebetween in the pixel area; and a data protection pattern covering the data line and the source electrode.

In another aspect of the present invention, the fringe field switching type thin film transistor substrate further includes a semiconductor layer forming a channel part of the thin film transistor under the source electrode and the drain electrode.

In another aspect of the present invention, in the fringe field switching type thin film transistor substrate, the source electrode and the drain electrode are separated from each other at a location overlapping the gate electrode, wherein the gate insulating film is formed therebetween to expose the semiconductor layer of the thin film transistor, thereby forming a channel part.

In another aspect of the present invention, in the fringe field switching type thin film transistor substrate, the surface of the channel part of the thin film transistor is treated with $O_2$ plasma.

In another aspect of the present invention, in fringe field switching type thin film transistor substrate, the pixel electrode slit and the data protection pattern include a transparent conductive layer.

In another aspect of the present invention, the fringe field switching type thin film transistor substrate further includes a gate pad connected to the gate line and formed of a same material as the gate line; a data pad connected to the data line through the data protection pattern and formed of the same material as the gate line; and a gate pad protection pattern which covers the gate pad and is formed of a same material as the data protection pattern.

In another aspect of the present invention, in the fringe field switching type thin film transistor substrate, the data protection pattern is directly connected to the data line and the data pad.

In another aspect of the present invention, in the fringe field switching type thin film transistor substrate, the pixel electrode slit includes a plurality of first slits symmetrically formed on the basis of the common line; and a second slit commonly connected to the plurality of first slits.

In another aspect of the present invention, a fabricating method of a fringe field switching type thin film transistor substrate includes sequentially depositing a transparent conductive layer and a metal layer on a substrate; forming, by use of a first mask, a double layered structure gate line having the transparent conductive layer and the metal layer, a gate electrode of a thin film transistor connected to the gate line, a gate metal pattern group inclusive of a common line which is parallel to the gate line, and a common electrode plate integrated with the transparent conductive layer of the common line by patterning the transparent conductive layer and the metal layer; forming a gate insulating film on the substrate where the gate metal pattern group is formed; spreading a source/drain metal layer on the substrate where the gate insulating film is formed; forming, by use of a second mask, a data line which crosses the gate line wherein the gate insulating film is formed therebetween, a source electrode of the thin film transistor connected to the data line, and a source/drain metal pattern group inclusive of a drain electrode opposing the source electrode; spreading a transparent conductive layer on the substrate where the source/drain metal pattern group is formed; and forming, by use of a third mask, a pixel electrode slit covering the drain electrode and overlapping the common electrode plate, wherein the gate insulating film is formed therebetween in a pixel area that is defined by the crossing of the gate line and the data line, and a data protection pattern covering the data line and the source electrode.

In another aspect of the present invention, in the fabricating method, any one of a diffractive exposure mask and a halftone mask is used as the first and second masks.

In another aspect of the present invention, the fabricating method further includes forming, by use of the second mask, a semiconductor layer forming a channel part of the thin film transistor under the source electrode and the drain electrode.

In another aspect of the present invention, the fabricating method further includes forming, by use of the third mask, a channel part which exposes the semiconductor layer of the thin film transistor by separating the source electrode and the drain electrode in a location overlapping the gate electrode, wherein the gate insulating film is formed therebetween.

In another aspect of the present invention, the fabricating method further includes treating the surface of the channel part of the thin film transistor with $O_2$ plasma.

In another aspect of the present invention, in the fabricating method, the pixel electrode silt and the data protection pattern include a transparent conductive material.

In another aspect of the present invention, the fabricating method further includes forming, by use of the first mask, a gate pad connected to the gate line and a data pad connected to the data line through the data protection pattern.

In another aspect of the present invention, the fabricating method further includes forming, by use of the third mask, a gate pad protection pattern covering the gate pad.

In another aspect of the present invention, the fabricating method further includes removing the gate insulating film on the gate pad and the data pad by use of the second mask.

In another aspect of the present invention, in the fabricating method, the data protection pattern is directly connected to the data pad and the data line from which the gate insulating film is removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A to 2E are sectional diagrams representing a fabricating method of the thin film transistor substrate of the related art shown in FIG. 1;

FIGS. 5A and 5B are a plan view and a sectional diagram of the fringe field switching type thin film transistor substrate after a first mask process according to an embodiment of the present invention;

FIGS. 6A to 6F are sectional diagrams illustrating the first mask process of the fringe field switching type thin film transistor according to an embodiment of the present invention;

FIGS. 7A and 7B are a plan view and a sectional diagram of the fringe field switching type thin film transistor substrate after a second mask process according to an embodiment of the present invention;

FIGS. 8A to 8E are sectional diagrams illustrating the second mask process of the fringe field switching type thin film transistor according to an embodiment of the present invention;

FIGS. 10A to 10C are sectional diagrams illustrating the third mask process of the fringe field switching type thin film transistor according to the embodiment of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
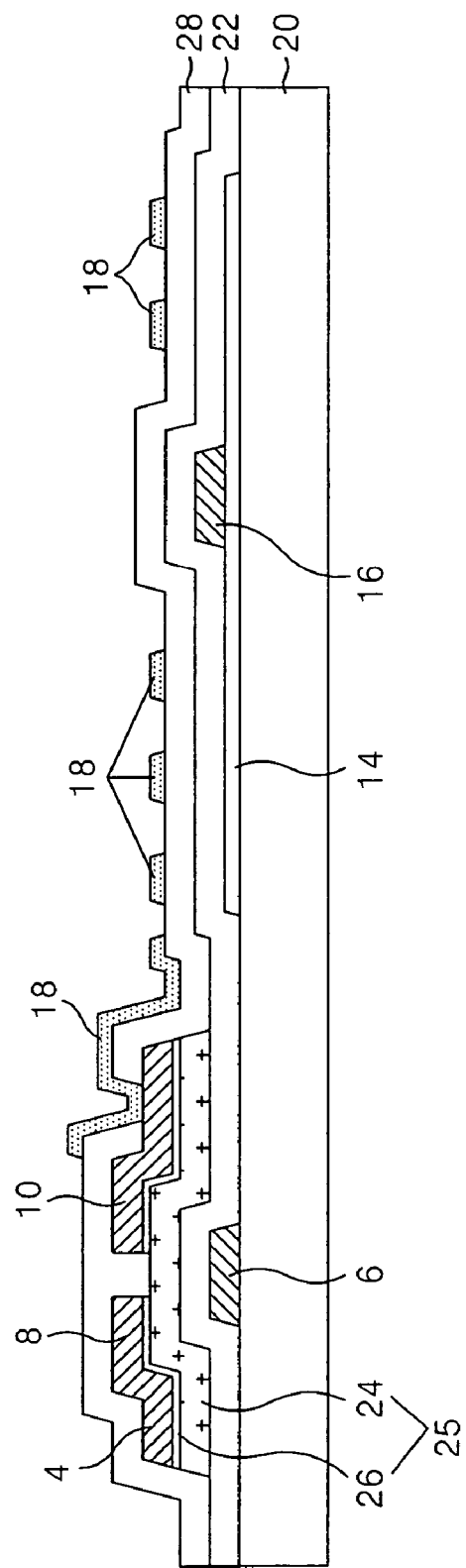
FIG. 1 is a fringe field switching type thin film transistor substrate of the related art.
Figure 2A:
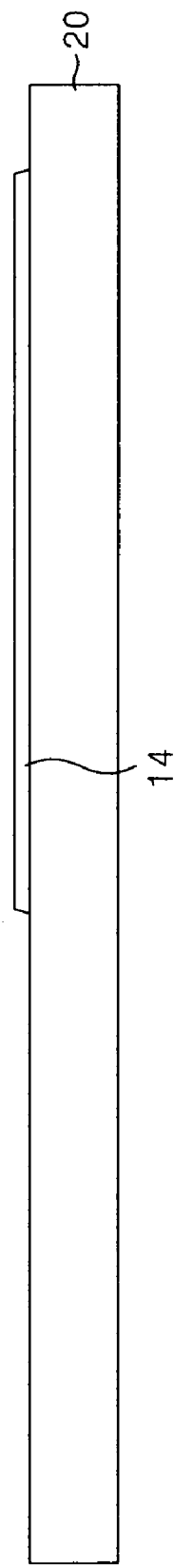
Figure 2C:
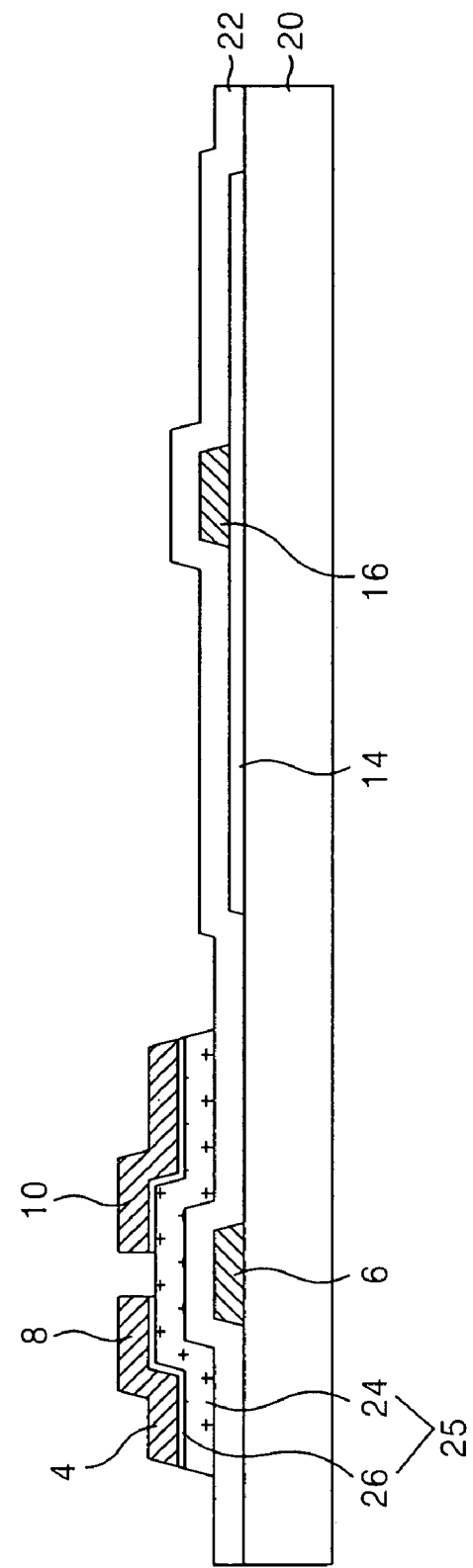
Figure 2D:
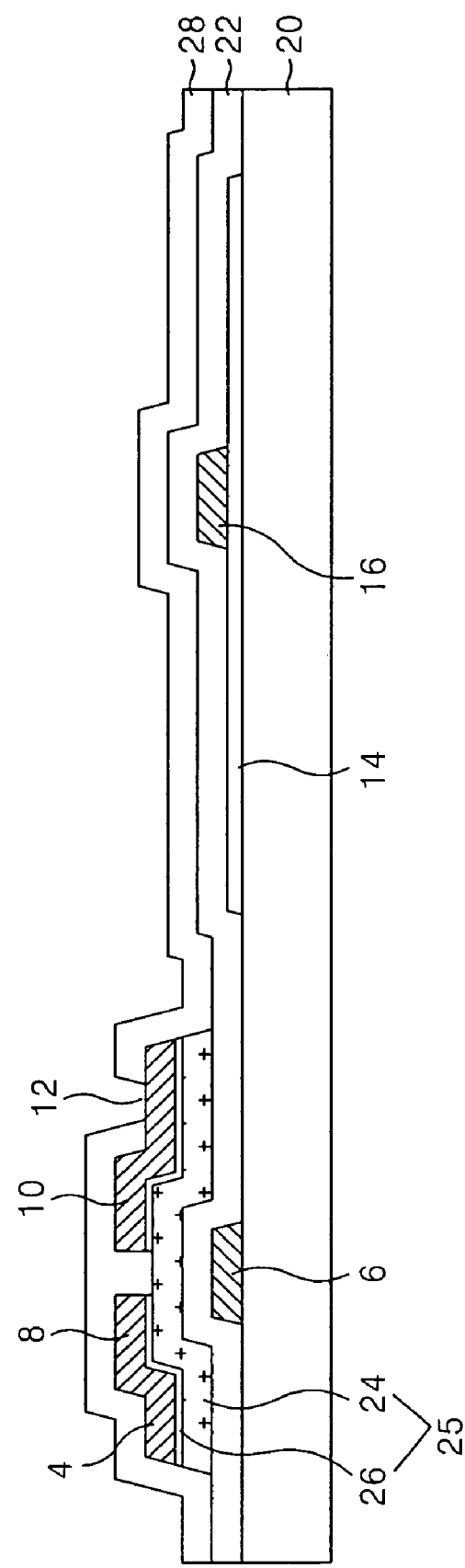
Figure 2E:
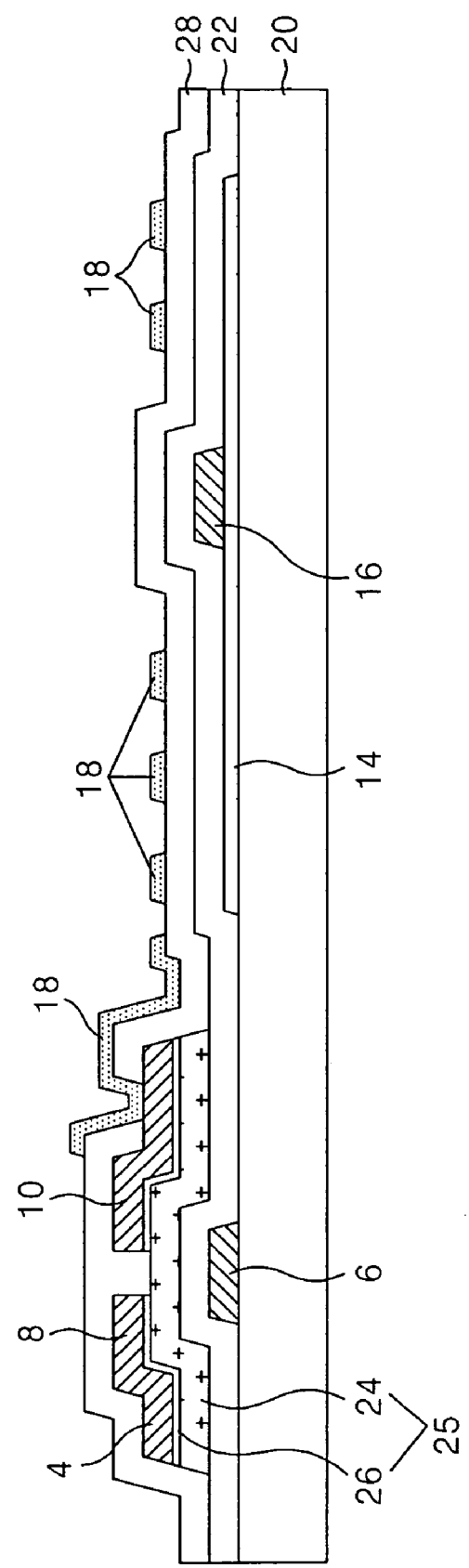
Figure 3:
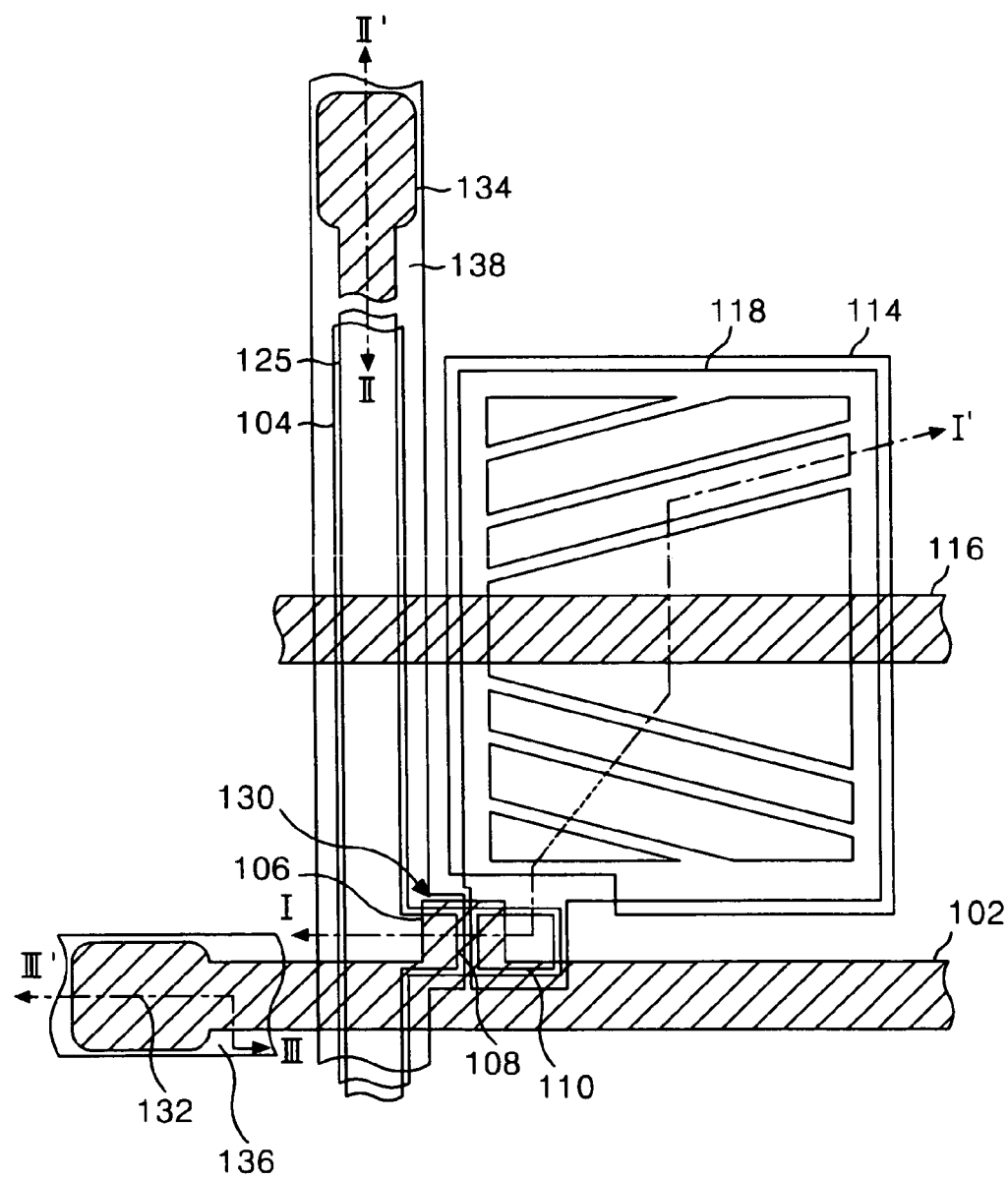
FIG. 3 is a plan view representing a fringe field switching type thin film transistor substrate according to an embodiment of the present invention.
Figure 4:
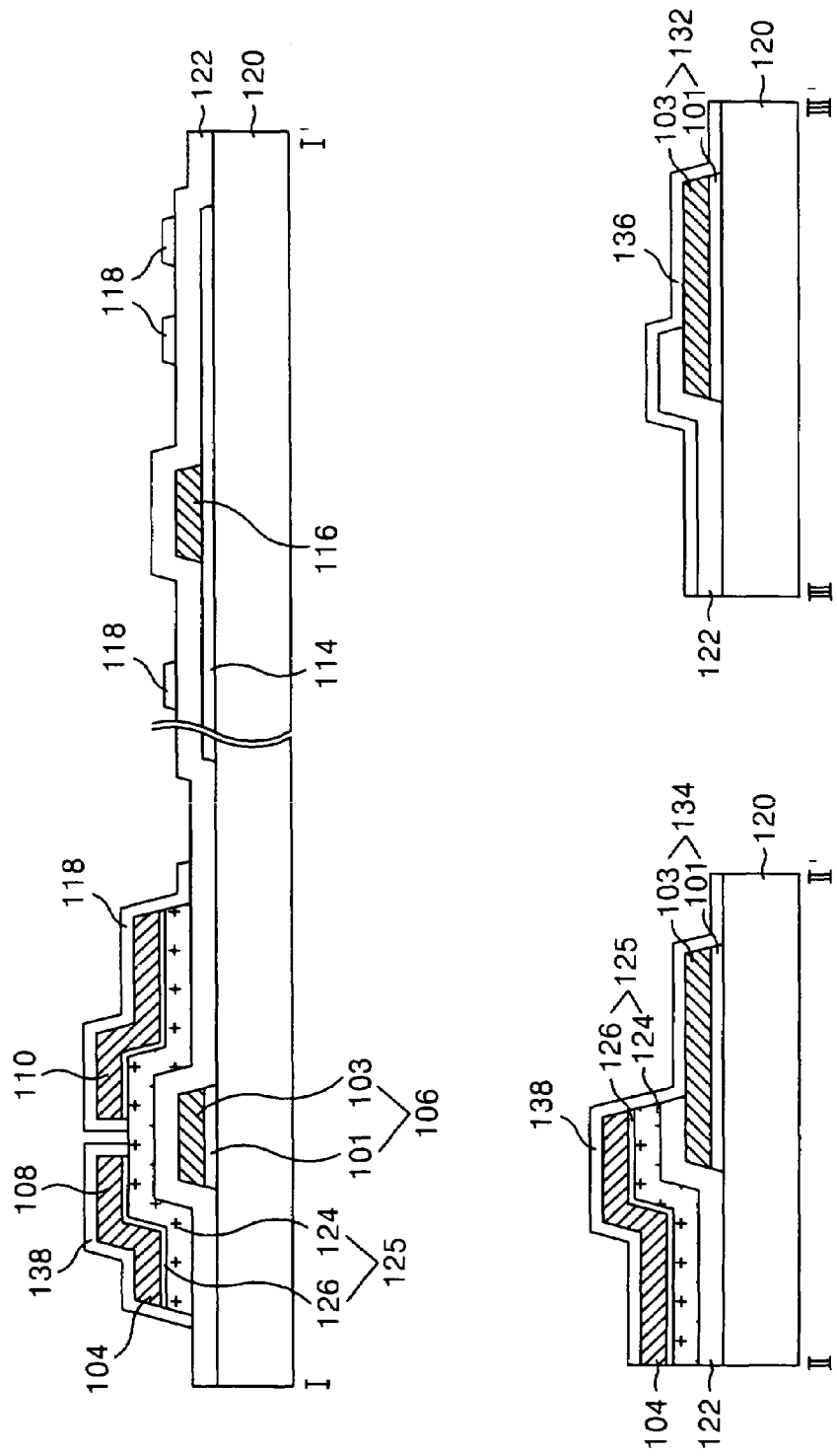
FIG. 4 is a sectional diagram of the thin film transistor substrate shown in FIG. 3, taken along the lines I-I', II-II', III-Ill'.

FIG. 3 is a plan view representing a fringe field switching type thin film transistor substrate according to an embodiment of the present invention, and FIG. 4 is a sectional diagram of the thin film transistor substrate, taken along the lines I-I', II-II', III-III'.

Referring to FIGS. 3 and 4, the FFS type TFT substrate according to the embodiment of the present invention includes a gate line 102 and a data line 104 formed on a substrate 120 to cross each other wherein a gate insulating film 122 is formed therebetween; a thin film transistor (TFT) formed at each crossing thereof; a common electrode plate 114 and a pixel electrode slit 118 formed with the gate insulating film 122 therebetween in order to form a fringe field in a pixel area that is provided by a cross structure of the gate line 102 and the data line 104; and a common line 116 connected to the common electrode plate 114. The TFT substrate further includes a gate pad 132 extended from the gate line 102; a gate pad protection pattern 136 for preventing the oxidation of the gate pad 132; and a data pad 134 connected to the data line 104 through the data protection pattern 138.

The gate line 102, the gate electrode 106 and the gate pad 132 are formed by having a transparent conductive layer 101 and a metal layer 103 deposited in a double structure. The metal layer 103 can be a metal layer of single/double/triple structure.

The common electrode plate 114 is formed at each pixel area, and a common voltage for driving liquid crystal is supplied through the common line 116 connected to the common electrode plate 114.

The common electrode plate 114 is formed in the same layer as the transparent conductive layer 101 included in the gate line 102, and the common line 116 is formed in the same layer as the metal layer 103 of the gate line 102.

The TFT 130 makes a pixel signal of the data line 104 charged and kept in the pixel electrode slit 118 in response to a gate signal of the gate line 102. The TFT 130 includes a gate electrode 106 connected to the gate line; a source electrode 108 connected to the data line 104; a drain electrode 110 connected to the pixel electrode slit 118; an active layer 124 which overlaps the gate electrode 106 wherein a gate insulating film 122 is formed therebetween to form a channel between the source electrode 108 and the drain electrode 110; and a semiconductor pattern 125 inclusive of an ohmic contact layer 126 for having the active layer 124 in ohmic contact with the source electrode 108 and the drain electrode 110. The semiconductor pattern 125 inclusive of the active layer 124 and the ohmic contact layer 126 is formed to overlap the data line 104.

A data protection pattern 138 is formed on the data line 104 and the source electrode 108 to protect the data line 104 and the source electrode 108 and connects the data line 104 with the data pad 134. The gate pad protection pattern 136 is formed to cover the gate pad 132 to prevent the oxidation of the gate pad 132.

The pixel electrode slit 118 directly connected to the drain electrode 110 of the TFT is formed to cover the entire surface of the drain electrode 110 for preventing oxidation and is formed to overlap the common electrode 114 wherein the gate insulating film 122 is formed therebetween. The pixel electrode slit 118 is formed of a transparent conductive layer and includes a plurality of first slits symmetrically formed on the basis of the common line 116 and a second slit commonly connected to the plurality of first slits. The pixel electrode slit 118 forms a fringe field with the common electrode plate 114 to make liquid crystal molecules, which are arranged in a horizontal direction between a TFT substrate and a color filter substrate, rotate by dielectric anisotropy.

Furthermore, there is formed a storage capacitor, which keeps the video signal supplied to the pixel electrode slit 118 stable in an overlapping part of the common electrode plate 114 and the pixel electrode slit 118.

A fabricating method of the FFS type TFT substrate with such a configuration is explained as follows, in reference to FIGS. 5A to 10C.

Figure 5A:
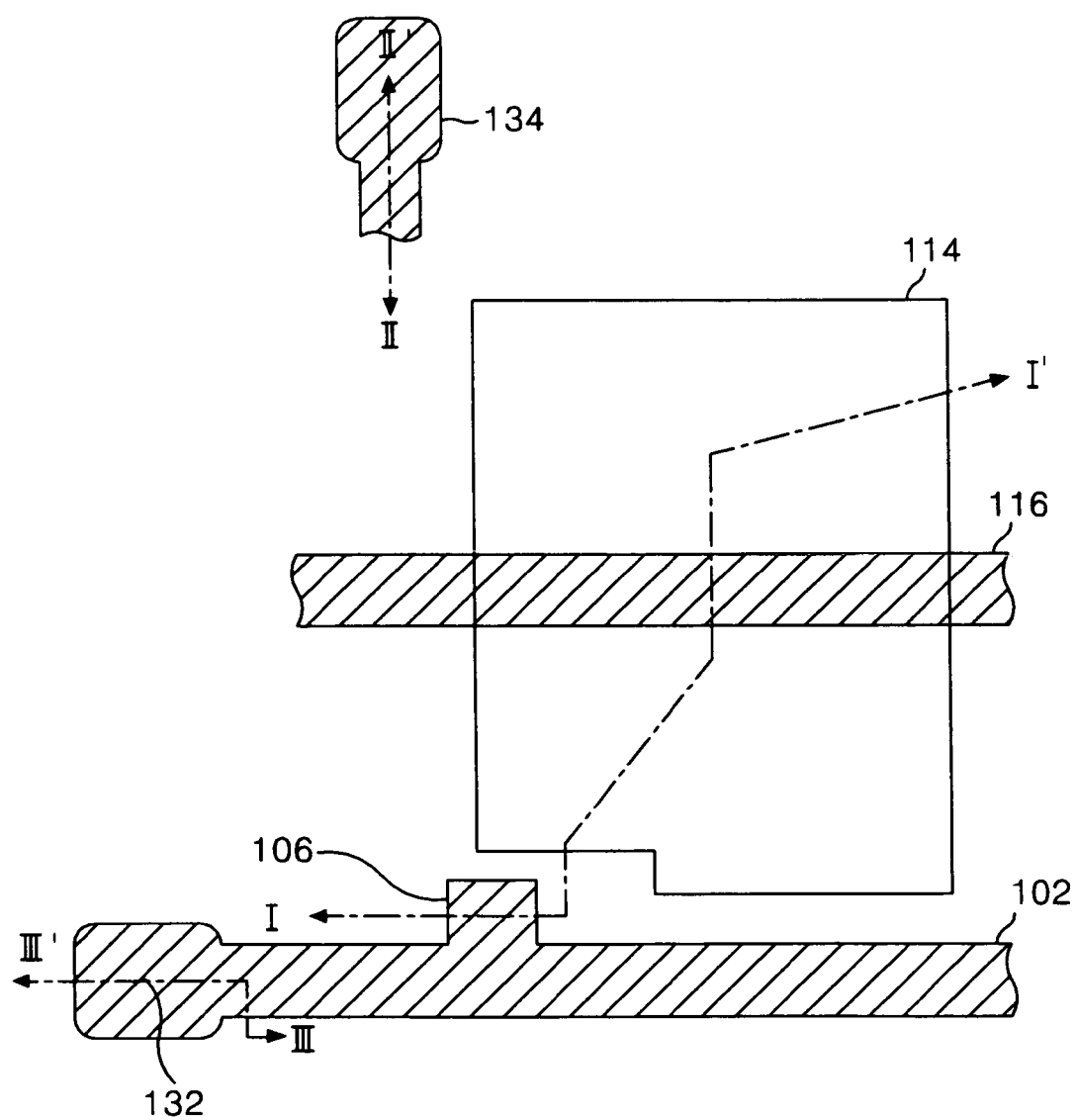

Referring to FIGS. 5A and 5B, a first mask process is used to form a gate pattern group which includes the gate line 102, the gate electrode 106, the gate pad 132, the data pad 134 and the common line 116 that are formed of the transparent conductive layer 101 and the metal layer 103, and the common electrode plate 114 that is formed of the transparent conductive layer 101 on the substrate 120.

The first mask process is explained in detail in reference to FIGS. 6A to 6F.

Figure 6A:
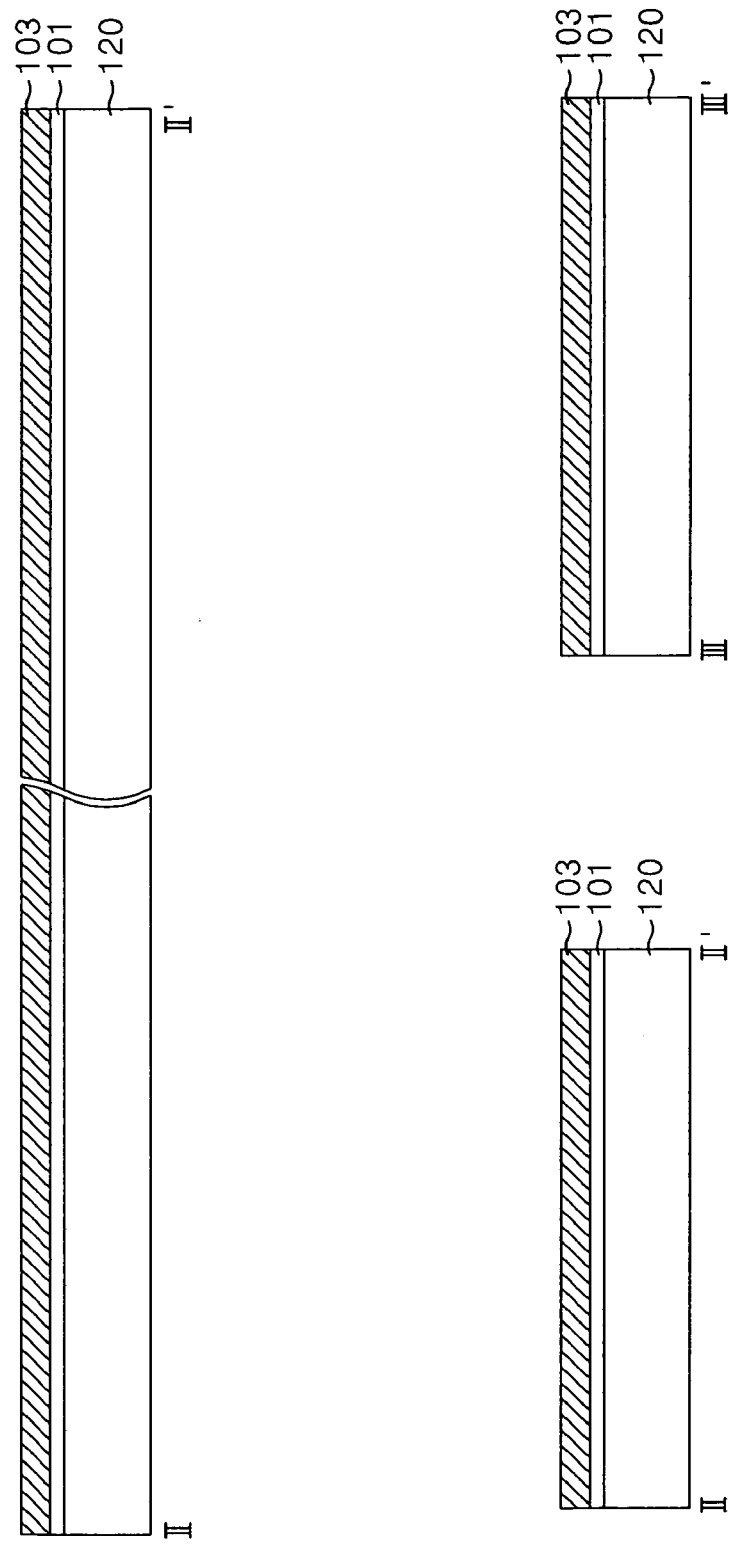

Referring to FIG. 6A, the transparent conductive layer 101 and the metal layer 103 are continuously deposited on the entire surface of the substrate 120 through a deposition method such as sputtering. Herein, the transparent conductive layer 101 is formed of a transparent conductive material such as indium tin oxide ITO, tin oxide TO, indium zinc oxide IZO.

Particularly, copper Cu can be used for a low resistance wiring, and in this case, there is no chemical loss with the transparent conductive layer 101 so it is more advantageous than using the existing aluminum metal system.

Referring to FIG. 6B, a photo-resist film is deposited on the entire surface of the metal layer 103 and a first mask 820 is aligned on the substrate 120. Then, a photo-resist pattern 830 is formed on the substrate 120 by a photolithography process. Herein, any one of a diffractive exposure mask (not shown) and a halftone mask can be used as the first mask 820, but only an embodiment using the halftone mask 820 will be explained in the embodiment of the present invention.

The photo-resist film is exposed and developed by use of the first mask 820 to form the photo-resist pattern 830 so that the photo-resist pattern 830 has a stepped difference in a shielding area P2 and a halftone area P3 which correspond to a shielding part 822 and a halftone part 823 of the first mask 820. Blank area P1 corresponds to a blank part of the first mask 820.

To describe this in detail, the photo-resist pattern 830b formed in the halftone area P3 has a height lower than the photo-resist pattern 830a having a first height which is formed in the shielding area P2.

Figure 6F:
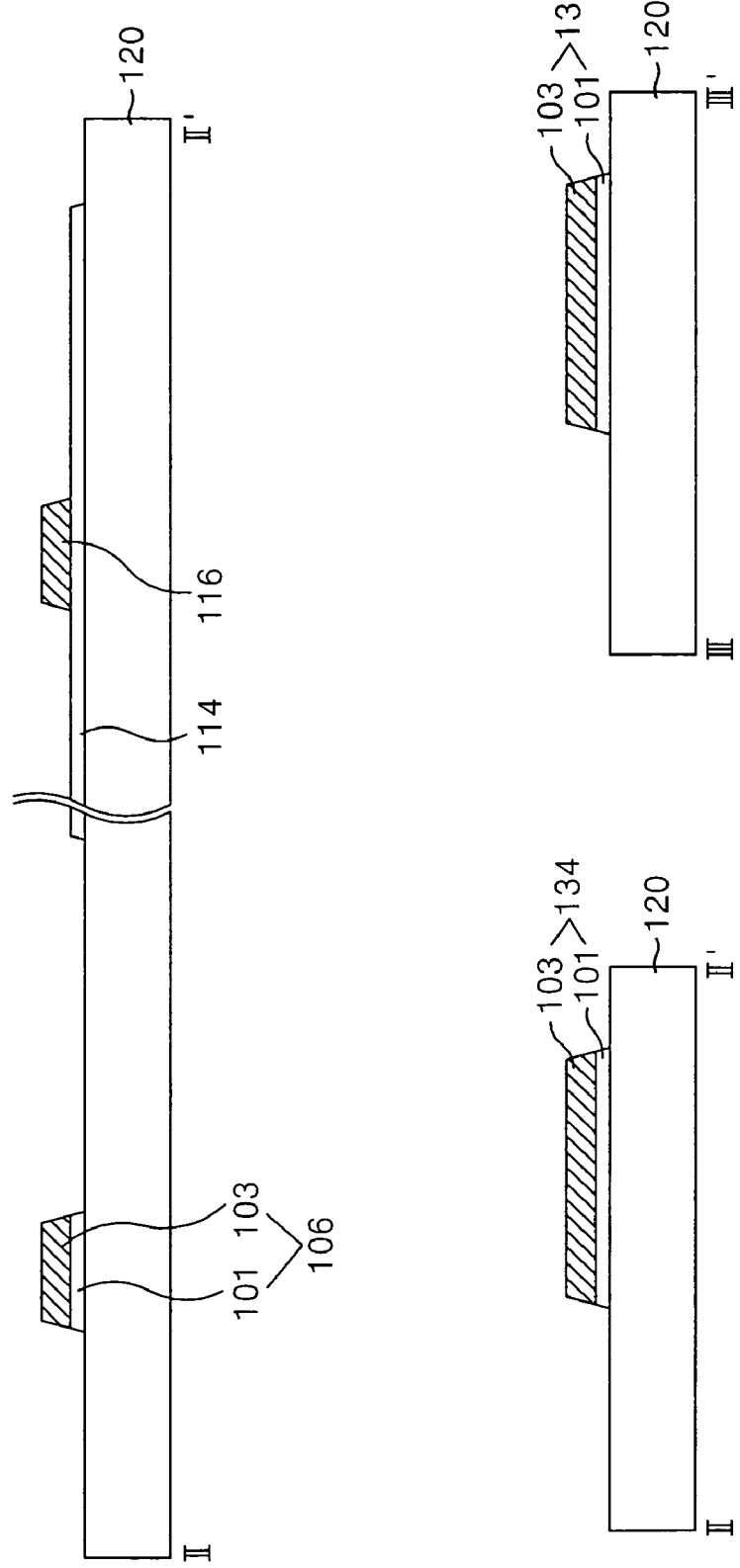

As shown in FIG. 6C, the transparent conductive layer 101 and the metal layer 103 are patterned by an etching process using the photo-resist pattern 830 as a mask. Subsequently, by an ashing process using oxygen $O_2$ plasma, as shown in FIG. 6D, the photo-resist pattern 830b having a second height in the halftone area P3 is removed and the photo-resist pattern 830a having a first height in the shielding area P2 is lowered. Subsequently, as shown in FIG. 6E, the exposed metal layer 103 is patterned by the etching process using the photo-resist pattern 830, of which the height is lowered in the shielding area P2, as a mask. Then, the photo-resist pattern 830 is removed by a stripping process, as shown in FIG. 6F.

In this way, by one mask process using a mask having such a halftone area P3, there are formed the gate line 102, the gate electrode 103, the gate pad 132, the data pad 134 and the common line 116 which are formed of the transparent conductive layer 101 and the metal layer 103, and the common electrode plate 114 which is formed of the transparent conductive layer 101. Thus, the mask processes of the related art can be reduced and replaced by the process of the present invention.

Figure 7A:
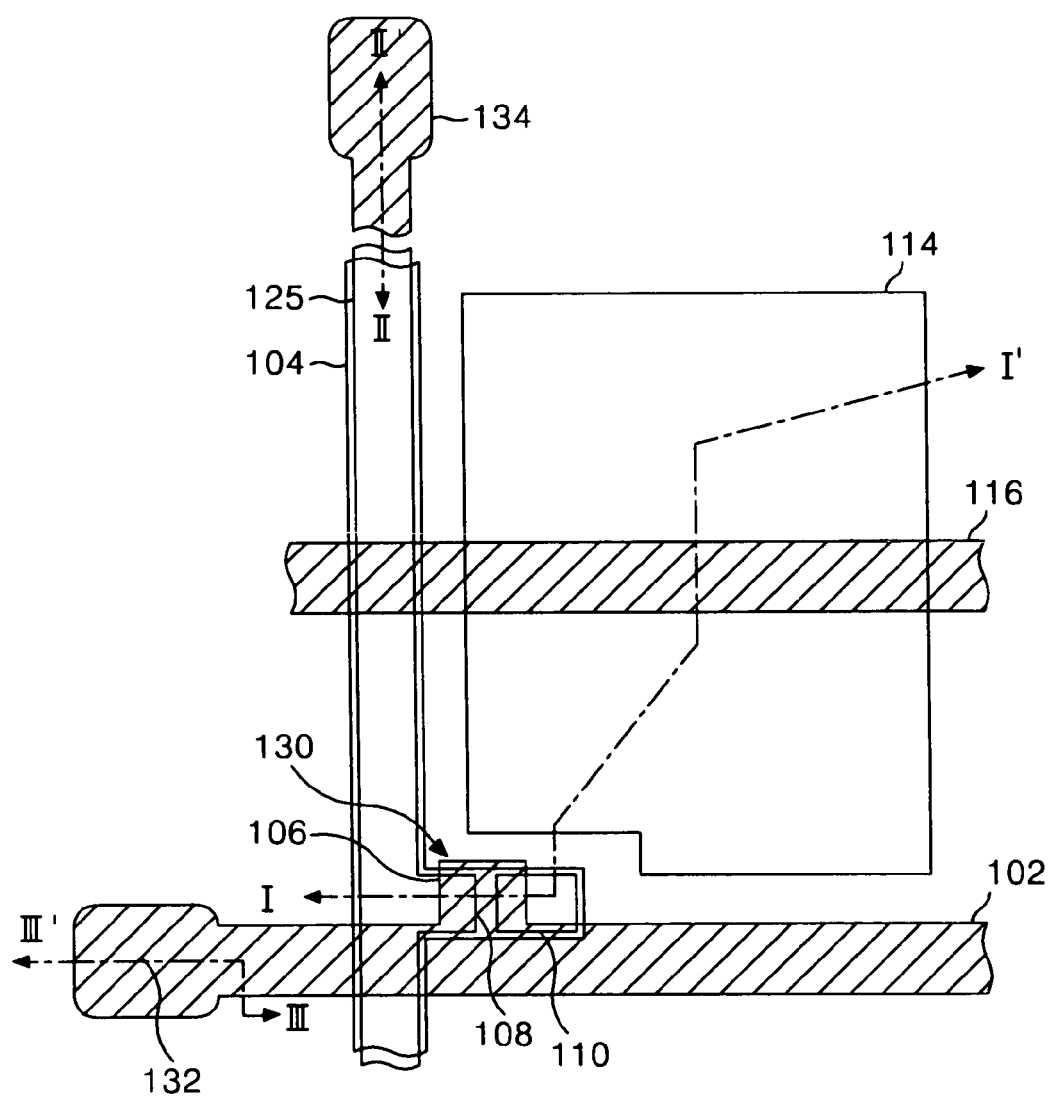

Referring to FIGS. 7A and 7B, a FFS type TFT substrate is shown to include a gate line 102 and a data line 104 formed on a substrate 120 to cross each other wherein a gate insulating film 122 is formed therebetween; a TFT 130 formed at each crossing thereof; a common electrode plate 114; a common line 116 connected to the common electrode plate 114; and a gate electrode 106. The gate insulating film 122 is formed on the substrate 120 where the gate pattern group is formed. By a second mask process, the semiconductor pattern 125 inclusive of the active layer 124 and the ohmic contact layer 126, and the source/drain metal pattern inclusive of the data line 104, the source electrode 108 and the drain electrode 110 are formed on the gate insulating film 122. Also, by the second mask process, the gate pad 132 and the data pad 134 are exposed.

The second mask process is explained in detail with reference to FIGS. 8A to 8E.

Figure 8A:
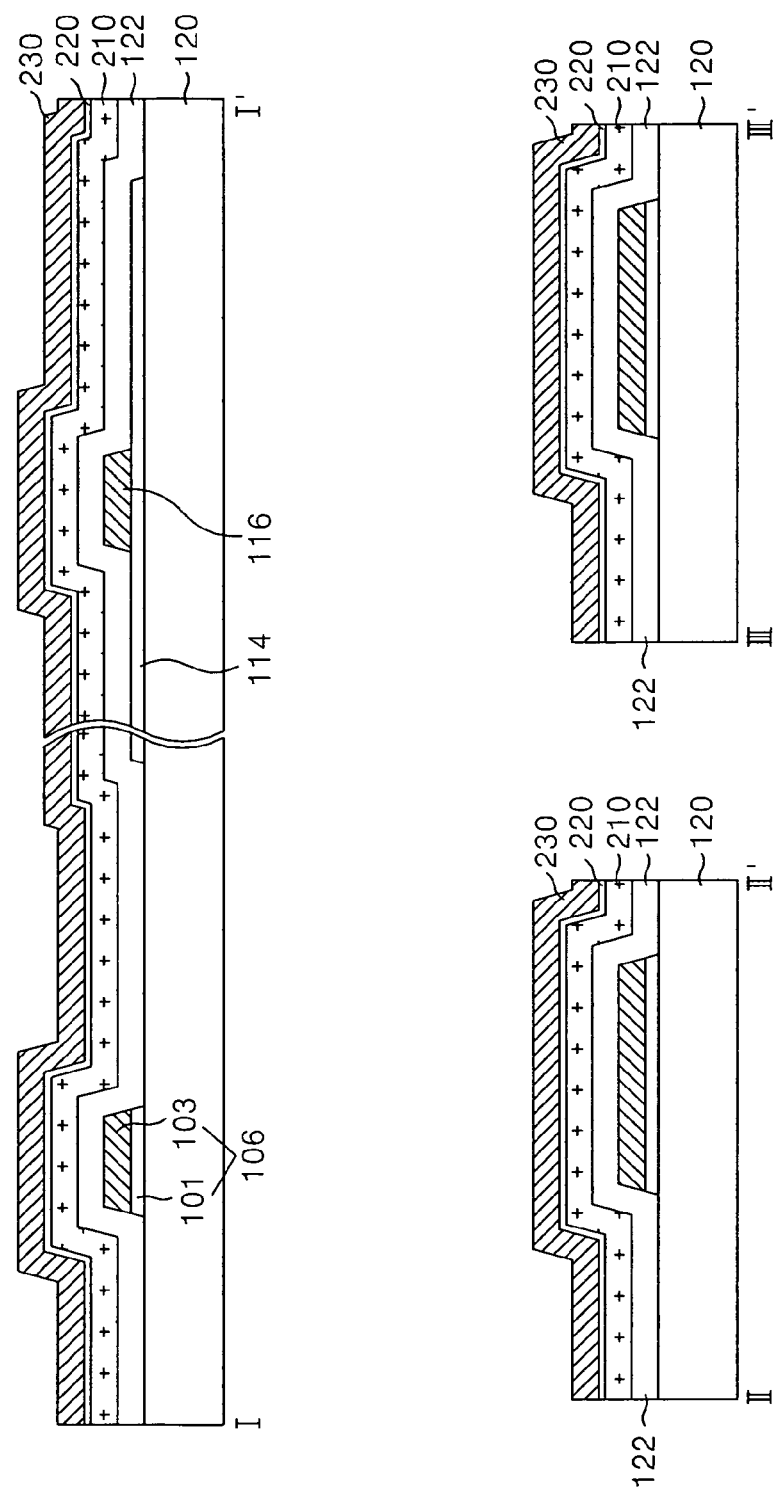

Referring to FIG. 8A, the gate insulating film 122, an amorphous silicon layer 210, an amorphous silicon layer 220 doped with impurities (n+ or p+) and a source/drain metal layer 230 are sequentially formed on the substrate 120 where the gate pattern group is formed. An inorganic insulating material such as silicon oxide ($SiO_x$) or silicon nitride ($SiN_x$) is used as a material of the gate insulating film 122. The material for the source/drain metal layer 230 is Cr, Mo, MoW, Al/Cr, Al(Nd), Al/Mo, Al(Nd)/Al, Al(Nd)/Cr, Mo/Al(Nd)/Mo, Cu/Mo or Ti/Al(Nd)/Ti.

Referring to FIG. 8B, the photo-resist film is deposited on the entire surface of the source/drain metal layer 230 and the second mask 810 is aligned on the substrate 120. After then, the photo-resist pattern 830 is formed on the substrate 120 by the photolithography process.

The photo-resist film is exposed and developed by use of the second mask 810 to form the photo-resist pattern 830 so that the photo-resist pattern 830 has a stepped difference in a shielding area P2 and a halftone area P1 which correspond to a shielding part 822 and a halftone part 823 of the second mask 810. The second mask 810 includes a substrate 811.

To describe this in detail, the photo-resist pattern 830b formed in the halftone area P1 has a second height lower than a first height of the photo-resist pattern 830a formed in the shielding area P2.

As shown in FIG. 8C, the gate insulating film 122 is patterned by the etching process using the photo-resist pattern 830 as a mask, thereby exposing the gate pad 132 and the data pad 134. Subsequently, by the ashing process using oxygen $O_2$ plasma, as shown in FIG. 8D, the photo-resist pattern 830b having the second height in the halftone area P3 is removed and photo-resist pattern 830a having the first height in the shielding area P2 is lowered. Subsequently, the amorphous silicon layer 210, the amorphous silicon layer 220 doped with the impurities (n+ or p+) and the source/drain metal layer 230 which are exposed are patterned by the etching process using the photo-resist pattern 830, of which the height is lowered in the shielding area P2, as a mask. Then, as shown in FIG. 8E, the photo-resist pattern 830 is removed by the stripping process.

Figure 9A:
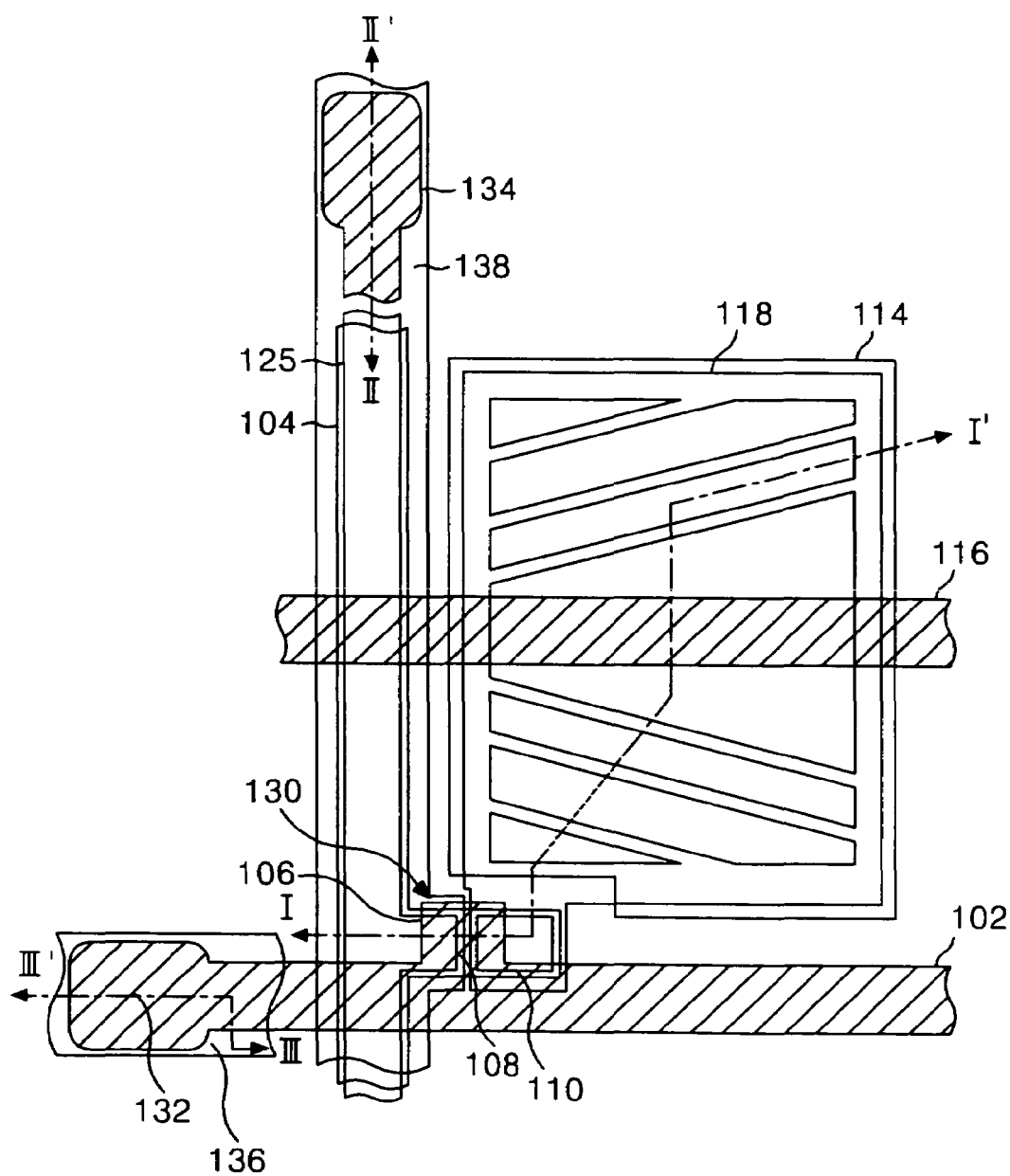
FIGS. 9A and 9B are a plan view and a sectional diagram of the fringe field switching type thin film transistor substrate after a third mask process according to an embodiment of the present invention.
Figure 9B:
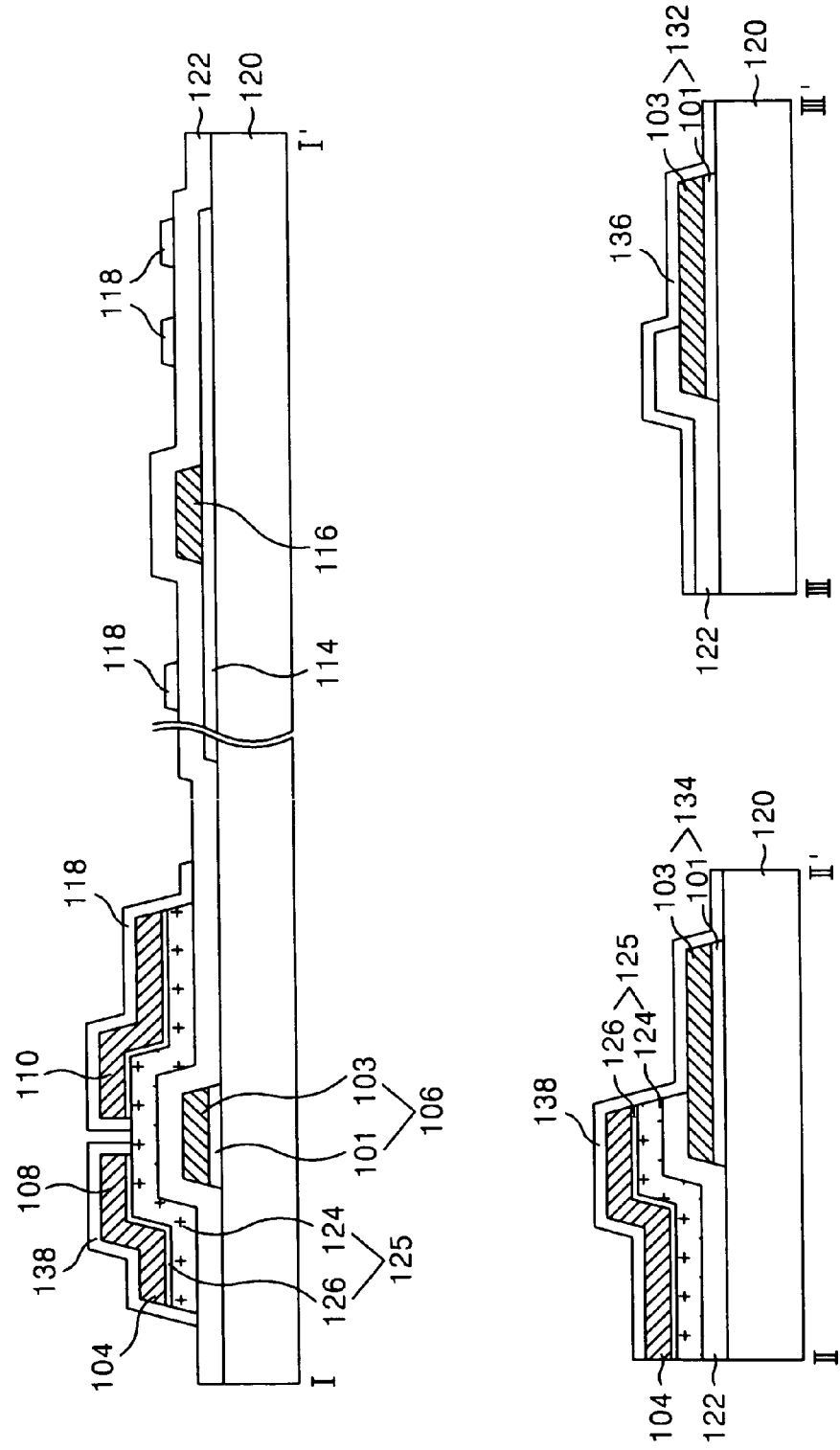

Referring to FIGS. 9A and 9B, the pixel electrode slit 118, the data protection pattern 138 connecting the data line 104 with the data pad 134, and the gate pad protection pattern 136 for protecting the gate pad 132 are formed by a third mask process on the substrate 120 where the semiconductor pattern 125 and the source/drain metal pattern are formed.

The third mask process will be explained in detail as follows, in reference to FIGS. 10A to 10C.

Referring to FIG. 10A, the transparent conductive material is spread over the entire surface of the substrate where the semiconductor pattern 125 and the source/drain metal pattern are formed and a third mask 870 is aligned on the substrate 120. Then, the photo-resist pattern 830 is formed on the substrate 120 by the photolithography process. The photo-resist pattern 830 is formed in a shielding area P2 which corresponds to a shielding part 812 and a blank area P1 of the third mask 870. The third mask 870 includes a substrate 811.

Figure 10B:
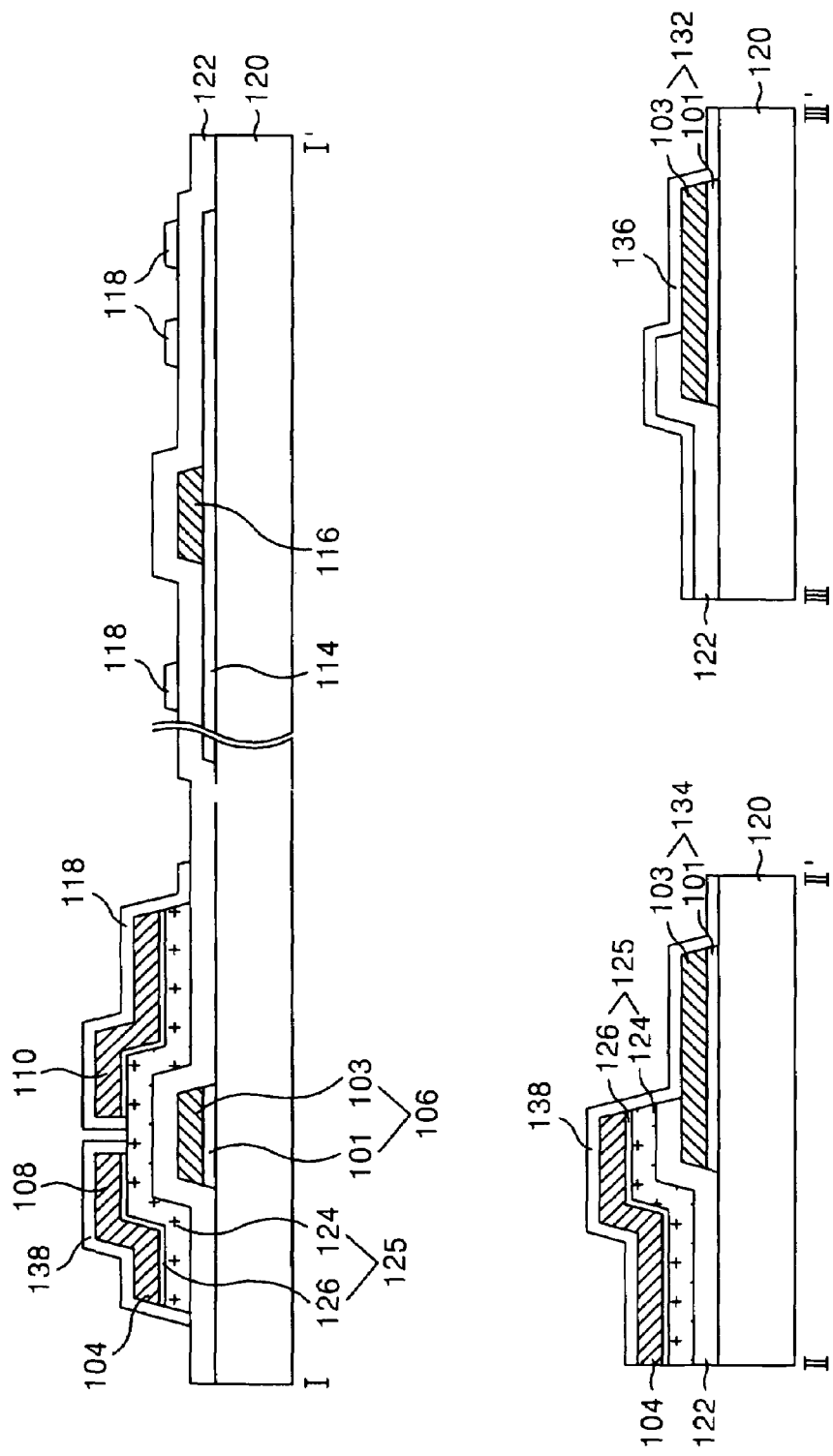
Figure 10C:
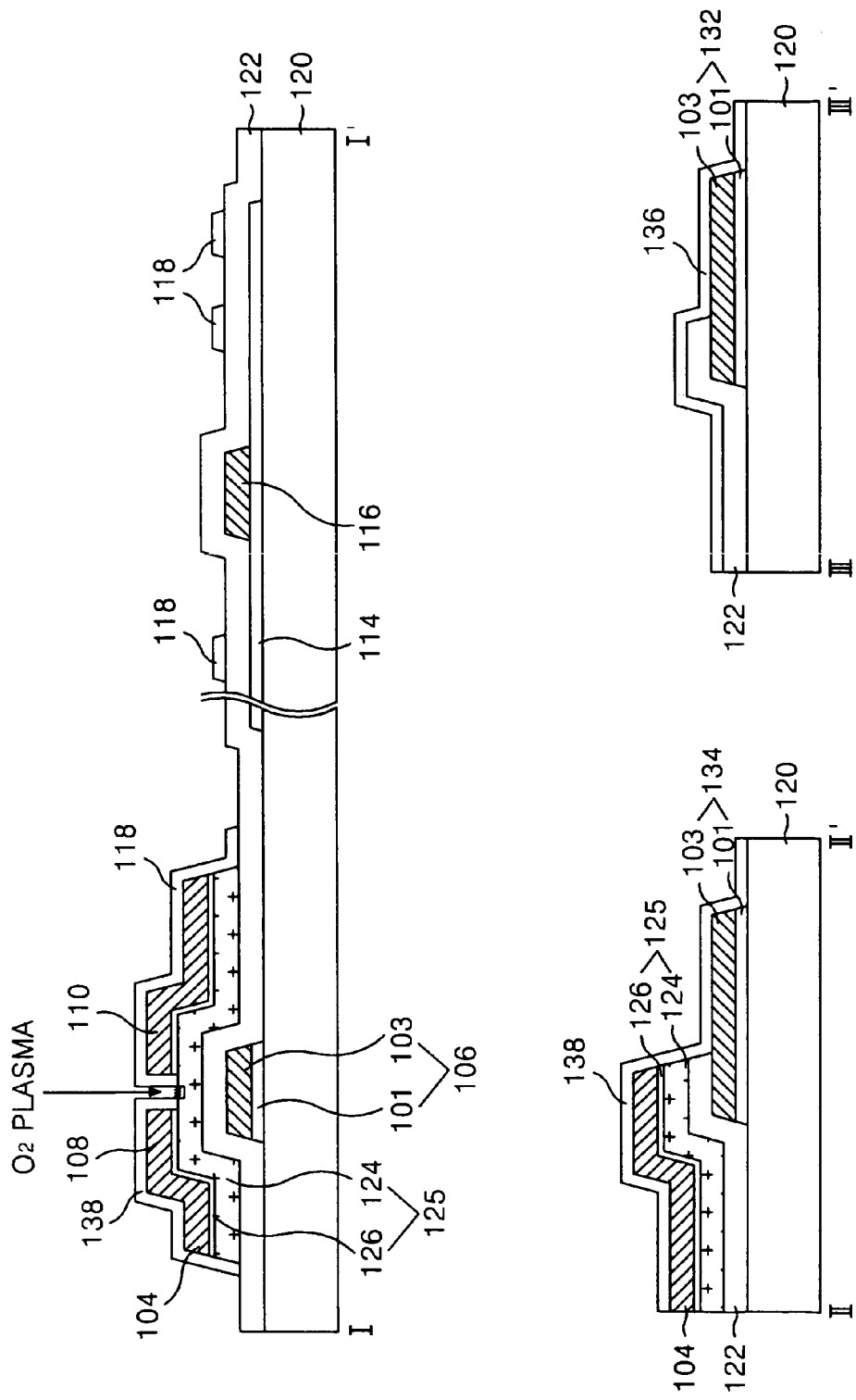

As shown in FIG. 10B, the pixel electrode slit 118, the data protection pattern 138, the gate pad protection pattern 136 and the channel part of the TFT are formed by the etching process using the photo-resist pattern 830 as a mask. In order to prevent the oxidation caused by the exposure of the channel part, $O_2$ plasma is performed in the exposed channel part so as to oxidize the active layer 124 of the exposed channel part, as shown in FIG. 10C. This is because the reliability of the TFT is improved by preventing the oxidation of the channel layer 124 of the channel part since there is no protection film.

The fabricating method of the FFS type TFT substrate according to the embodiment of the present invention forms the transparent conductive layer and the metal layer, which are to be patterned by the first mask process, by use of one mask process, i.e., halftone mask or diffractive exposure mask, and does not form the passivation film which protects the channel part, the source and drain electrodes 108, 110, the data line 104, the data pad 134 and the gate pad 132, thereby enabling the reduction of the number of fabricating processes of the FFS type TFT substrate. The exposed data line 104, the exposed data pad 134 and the exposed gate pad 132 are protected from oxidizing by the gate pad protection pattern 136 and the data protection pattern 138 formed together with the pixel electrode slit 118.

As described above, the fabricating method of the FFS type TFT substrate according to the embodiment of the present invention forms the transparent conductive layer and the metal layer, which are to be patterned by the first mask process, by use of one mask process, i.e., halftone mask or diffractive exposure mask, and does not form the passivation film which protects the channel part, the source and drain electrodes, the data line, the data pad and the gate pad, thereby enabling the reduction of the number of fabricating processes of the FFS type TFT substrate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fringe field switching type thin film transistor substrate, comprising:
    a double layered structure gate line having a first transparent conductive layer and a metal layer on a substrate;
    a data line crossing the gate line, wherein a gate insulating film is formed therebetween;
    a thin film transistor having a gate electrode connected to the gate line, a source electrode connected to the data line, a drain electrode opposing the source electrode, and a semiconductor layer forming a channel part under the source electrode and the drain electrode;
    a double layered structure common line having the first transparent conductive layer and the metal layer, wherein the double layered structure common line is parallel to the gate line;
    a common electrode plate integrated with the first transparent conductive layer of the common line and formed in a pixel area defined by the crossing of the gate line and the data line, wherein the common electrode plate is formed of the same layer as the first transparent conductive layer of the gate line and the common line;
    a pixel electrode with silts being formed of the second transparent conductive layer, wholly covering the drain electrode, directly contacting with the drain electrode, and overlapping the common electrode plate, wherein the gate insulating film alone is formed between the common electrode plate and the pixel electrode in the pixel area; and
    a data protection pattern wholly covering the data line and the source electrode and directly contacting with the data line and the source electrode, wherein the data protection pattern is formed of the same second transparent conductive layer as the pixel electrode.

2. The fringe field switching type thin film transistor substrate according to claim 1, wherein a surface of the channel part of the thin film transistor is treated with $O_2$ plasma.

3. The fringe field switching type thin film transistor substrate according to claim 1, further comprising:
    a gate pad connected to the gate line and formed of the same double layered structure as the gate line;
    a data pad connected to the data line through the data protection pattern and formed of the same double layered structure as the gate line, wherein the data protection pattern covers the data pad and directly contacts with the data pad; and
    a gate pad protection pattern which covers the gate pad and is formed of the same second transparent conductive layer as the data protection pattern and directly contacts with the gate pad.

4. The fringe field switching type thin film transistor substrate according to claim 1, wherein the pixel electrode includes:
    a plurality of first slits symmetrically formed on the basis of the common line; and
    a second slit commonly connected to the plurality of first slits.

* * * * *